(12) United States Patent
Vincent et al.

(10) Patent No.: US 10,800,596 B1
(45) Date of Patent: *Oct. 13, 2020

(54) INSULATION PANEL

(71) Applicant: TemperPack Technologies, Inc., Richmond, VA (US)

(72) Inventors: Charles-Alexandre Vincent, St. Bruno de Montarville (CA); James McGoff, Silver Spring, MD (US)

(73) Assignee: TEMPERPACK TECHNOLOGIES, INC., Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/518,864

(22) Filed: Jul. 22, 2019

Related U.S. Application Data

(63) Continuation-in-part of application No. 15/855,285, filed on Dec. 27, 2017, now Pat. No. 10,357,936.

(60) Provisional application No. 62/491,651, filed on Apr. 28, 2017, provisional application No. 62/491,666, filed on Apr. 28, 2017.

(51) Int. Cl.
*B32B 3/18* (2006.01)
*B32B 3/26* (2006.01)
*B32B 7/14* (2006.01)
*B32B 27/06* (2006.01)
*B32B 37/10* (2006.01)
*B65D 81/38* (2006.01)

(52) U.S. Cl.
CPC ............ *B65D 81/3813* (2013.01); *B32B 3/18* (2013.01); *B32B 3/26* (2013.01); *B32B 7/14* (2013.01); *B32B 27/06* (2013.01); *B32B 37/10* (2013.01); *B32B 2307/304* (2013.01); *B32B 2307/73* (2013.01); *B32B 2607/00* (2013.01)

(58) Field of Classification Search
CPC ....... B32B 2317/20; B32B 3/26; B32B 27/06; B32B 37/10
See application file for complete search history.

(56) References Cited

U.S. PATENT DOCUMENTS

| | | |
|---|---|---|
| 1,914,799 A | 6/1933 | Bidwell |
| 2,649,958 A | 8/1953 | Rausch |
| 2,717,114 A | 9/1955 | Parham, Jr. |
| 3,031,121 A | 4/1962 | Herbert |
| 4,010,865 A | 3/1977 | Wilgus |
| 4,773,541 A | 9/1988 | Riddell |
| 5,151,312 A | 9/1992 | Boeri |
| 5,186,990 A | 2/1993 | Starcevich |
| 5,208,267 A | 5/1993 | Neumann et al. |
| 5,215,248 A | 6/1993 | Moser |

(Continued)

FOREIGN PATENT DOCUMENTS

| | | |
|---|---|---|
| AU | 2009201479 A1 | 5/2009 |
| DE | 19654672 A1 | 2/1998 |

(Continued)

*Primary Examiner* — Alexandre F Ferre
(74) *Attorney, Agent, or Firm* — Troutman Pepper Hamilton Sanders LLP; Christopher J. Forstner; John A. Morrissett

(57) ABSTRACT

An insulation panel has an insulation core layer disposed that includes at least a first particulate and a second particulate of a plurality of discrete puffed polysaccharide particulates that defines a plurality of voids within the core layer. The first particulate is at least partially adhered to at least the second particulate at one or more bonded areas without the use of external non-water-soluble adhesives.

22 Claims, 24 Drawing Sheets

(56) References Cited

U.S. PATENT DOCUMENTS

| | | |
|---|---|---|
| 5,226,557 A | 7/1993 | Nelson |
| 5,230,943 A | 7/1993 | Pregont |
| 5,252,271 A | 10/1993 | Jeffs |
| 5,322,181 A | 6/1994 | Nelson |
| 5,362,776 A | 11/1994 | Barenberg et al. |
| 5,515,975 A | 5/1996 | Jarvis et al. |
| 5,569,519 A | 10/1996 | Ervay et al. |
| 5,636,744 A | 6/1997 | Hirose |
| 5,699,645 A | 12/1997 | Vaccarello |
| 5,766,529 A | 6/1998 | Franke et al. |
| 5,820,268 A | 10/1998 | Becker et al. |
| 5,826,725 A | 10/1998 | Hornstein et al. |
| 5,897,944 A | 4/1999 | Loercks et al. |
| 6,030,673 A | 2/2000 | Andersen et al. |
| 6,106,753 A | 8/2000 | Redd et al. |
| 6,723,264 B1 | 4/2004 | Bussey, Jr. et al. |
| 6,736,309 B1 | 5/2004 | Westerman et al. |
| 6,837,420 B2 | 1/2005 | Westerman et al. |
| 6,878,199 B2 | 4/2005 | Bowden et al. |
| 7,135,063 B2 | 11/2006 | Franke et al. |
| 7,140,773 B2 | 11/2006 | Becker et al. |
| 7,882,678 B1 | 2/2011 | Burlet |
| 8,011,511 B2 | 9/2011 | Oyler et al. |
| 8,146,748 B2 | 4/2012 | Vulpitta |
| 8,227,075 B2 | 7/2012 | Matsushita |
| 8,365,943 B2 | 2/2013 | Bentley |
| 8,557,367 B2 | 10/2013 | Netravali et al. |
| 8,763,811 B2 | 7/2014 | Lantz |
| 9,056,423 B2 | 6/2015 | Lee et al. |
| 9,550,618 B1 | 1/2017 | Jobe |
| 9,751,683 B1 | 9/2017 | Jobe |
| 9,920,517 B2 | 3/2018 | Sollie et al. |
| 9,981,797 B2 | 5/2018 | Aksan et al. |
| 10,138,628 B2 | 11/2018 | Sollie et al. |
| 10,266,332 B2 | 4/2019 | Aksan et al. |
| 10,392,177 B2 | 8/2019 | Lantz |
| 10,400,443 B2 | 9/2019 | Sollie et al. |
| 10,435,884 B2 | 10/2019 | Sollie et al. |
| 10,625,923 B2 | 4/2020 | Jobe |
| 2002/0068139 A1 | 6/2002 | Polak et al. |
| 2005/0139509 A1 | 6/2005 | Bussey, Jr. et al. |
| 2007/0092712 A1 | 4/2007 | Hodson |
| 2007/0122584 A1 | 5/2007 | Song et al. |
| 2008/0086982 A1 | 4/2008 | Parenteau et al. |
| 2008/0260303 A1 | 10/2008 | De Lesseux et al. |
| 2009/0034883 A1 | 2/2009 | Giuliani |
| 2009/0047525 A1 | 2/2009 | Tilton |
| 2011/0100868 A1 | 5/2011 | Lantz |
| 2011/0259895 A1 | 10/2011 | Parenteau et al. |
| 2012/0031957 A1 | 2/2012 | Whitaker |
| 2012/0097067 A1 | 4/2012 | Fascio |
| 2014/0117071 A1 | 5/2014 | Kannankeril et al. |
| 2016/0052692 A1 | 2/2016 | Branham |
| 2016/0060412 A1 | 3/2016 | Barrette |
| 2016/0347531 A1 | 12/2016 | Becker |
| 2017/0020174 A1 | 1/2017 | Yousef Zadeh |
| 2017/0043937 A1 | 2/2017 | Lantz |
| 2017/0283157 A1 | 10/2017 | Jobe |
| 2017/0341847 A1 | 11/2017 | Chase et al. |
| 2018/0086539 A1 | 3/2018 | Aksan et al. |
| 2018/0162597 A1 | 6/2018 | Jobe |
| 2018/0229917 A1 | 8/2018 | Jobe |
| 2018/0229961 A1 | 8/2018 | Jobe |
| 2018/0237184 A1 | 8/2018 | Jobe |
| 2018/0237206 A1 | 8/2018 | Jobe |
| 2018/0237207 A1 | 8/2018 | Aksan et al. |
| 2018/0299059 A1 | 10/2018 | McGoff et al. |
| 2019/0185246 A1 | 6/2019 | Sollie et al. |
| 2019/0185248 A1 | 6/2019 | Aksan et al. |
| 2019/0193917 A1 | 6/2019 | Aksan et al. |
| 2019/0352080 A1 | 11/2019 | Waltermire et al. |
| 2019/0359412 A1 | 11/2019 | Sollie et al. |
| 2019/0359413 A1 | 11/2019 | Sollie et al. |
| 2019/0359414 A1 | 11/2019 | Sollie et al. |
| 2019/0367208 A1 | 12/2019 | Jobe |
| 2020/0122909 A1 | 4/2020 | Jobe |

FOREIGN PATENT DOCUMENTS

| | | |
|---|---|---|
| DE | 102005030711 A1 | 1/2007 |
| EP | 0068873 A2 | 1/1983 |
| EP | 1321289 B1 | 7/2006 |
| EP | 1327663 B1 | 5/2007 |
| JP | 2003013391 A | 1/2003 |
| JP | 2009073197 A | 4/2009 |
| WO | 90/07457 A1 | 7/1990 |
| WO | 92/04253 A1 | 3/1992 |
| WO | 92/09766 A1 | 6/1992 |
| WO | 95/04779 A1 | 2/1995 |
| WO | 97/37842 A1 | 10/1997 |
| WO | 2007/006046 A1 | 1/2007 |
| WO | 2008/109158 A2 | 9/2008 |
| WO | 2009/079579 A1 | 6/2009 |
| WO | 2009/103052 A1 | 8/2009 |
| WO | 2011/049866 A2 | 4/2011 |
| WO | 2016/029024 A1 | 2/2016 |
| WO | 2018107087 A3 | 6/2018 |
| WO | 2018165164 A1 | 9/2018 |
| WO | 2020023520 A1 | 1/2020 |
| WO | 2020069444 A1 | 4/2020 |

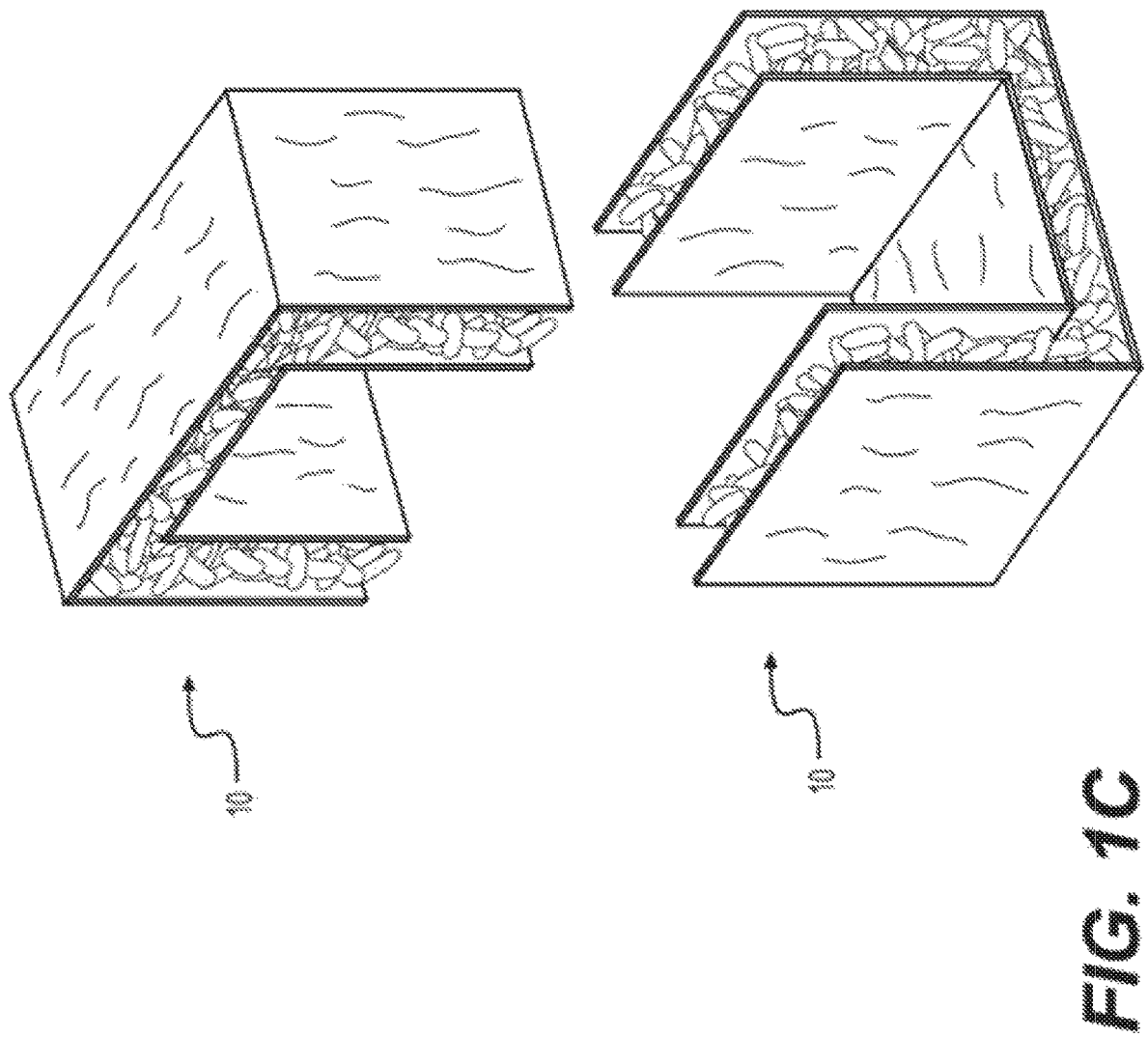

INSULATION PANEL

CROSS-REFERENCE TO RELATED APPLICATION

This is a continuation-in-part application of U.S. patent application Ser. No. 15/855,285, titled "Insulation Panel" and filed Dec. 27, 2017, which claims benefit of priority to U.S. Provisional Patent Application Nos. 62/491,666 and 62/491,651 filed on Apr. 28, 2017, the contents of which are hereby incorporated by reference.

FIELD

The presently disclosed subject matter generally relates to insulation panels and systems and methods for producing and using the same, particularly insulation panels for insulating shipping containers and systems and methods for producing and using the same.

BACKGROUND

Insulation materials have long been used in a variety of applications and are being increasingly used in insulated shipping containers to provide desired or required thermal environments when shipping goods. For example, an insulated shipping container transporting perishable goods (e.g., refrigerated meals) may increase the longevity of the goods and, in turn, expand the shipping area of the customer base. While some insulated shipping containers are designed for long term use, others are designed for a more limited lifespan in favor of lower materials and manufacturing costs. While these limited lifespan shipping containers practically serve their intended purpose, the ever-increasing volume of shipping containers results in higher levels of waste, most of which is non-recyclable at least in part because the insulation materials are often non-recyclable. Environmentally conscious retailers and consumers are faced with limited environmentally friendly and responsible options, much less cost-effective options, for disposing insulation materials or insulated shipping containers following use.

Accordingly, there is a need for improved insulation panels for insulating shipping containers and systems and methods for producing and using improved insulation panels to address the above-mentioned limitations. Embodiments of the present disclosure are directed to this and other considerations.

SUMMARY

Briefly described, embodiments of the presently disclosed subject matter relate to an insulation panel. Specifically, in one aspect, an insulation panel may include a top paper-based barrier (e.g., kraft paper), a bottom paper-based barrier (e.g., kraft paper), and an insulation core layer disposed between to the top and bottom barriers. The insulation core layer, which may include a plurality of discrete hydrated compressed puffed carbohydrate (e.g., polysaccharides such as starch, including vegetable starch, or cellulose) particulates, may be adhered to the top and bottom barriers without using external, non-water-soluble adhesives or other tacky materials that would compromise the recyclability of the insulation panel. Similarly, the particulates within the insulation core layer may be adhered to one another, with the plurality of discrete particulates defining a plurality of voids within the core layer to create a bonded, semi-rigid structure. The adhesion between (i) the insulation core layer and the top and bottom barriers and/or (ii) individual particulates of the insulation core layer may be facilitated by one or more of the following mechanisms: mechanical adhesion, chemical adhesion, dispersive adhesion, and diffusive adhesion. With mechanical adhesion, a first particulate may be held in position by being trapped between other particulates of the insulation core layer and/or the paper-based barrier(s), and the paper-based barrier(s) may be held in position by conforming to the contours of one or more particulates after wetting and drying. With chemical adhesion, a first particulate may be held in place relative to a second particulate via one or more glycosidic linkages, such as an "O"-glycosidic linkage. With dispersive adhesion or physisorption, a first particulate may bond to the paper-based barrier(s) by van der Waals forces (e.g., the attraction between molecules, each of which have a region of slight positive and negative charge). With diffusive adhesion, molecules in at least a portion of two particulates are soluble in each other and intermingle, thereby joining particles of each particulate into one. The energy applied to the particulates during diffusive adhesion may change the chemistry of the particles of one or more of the particulates in some embodiments and may not alter the chemistry of the particles in other embodiments. The external hydration (e.g., hydration not intrinsic within the particulates) may aid the bonds formed through one or more of these mechanisms between the particulates and/or between particulate(s) and the paper-based barrier(s). Optionally, the application of heat and/or heat and pressure may also aid the bonds formed through one or more of these mechanisms between the particulates and/or between particulate(s) and the paper-based barrier(s).

In some embodiments, one or more of the top and bottom barriers are at least one of repulpable (e.g., in a paper mill), curbside recyclable with paper and corrugate materials, supercalendered, and grease-and-water-resistant. For example, the top and bottom barriers may both be repulpable, curbside recyclable, supercalendered, and grease-and-water-resistant, and one or more of the top and bottom barriers may include kraft paper, machine glazed (MG) paper, smooth finished (SF) paper, machined finished (MF) paper, glassines, paper-based, and/or supercalendered kraft (SCK) paper.

In another aspect, a method for fabricating an insulation panel may include directing a first fluid that does not contain external non-water-soluble adhesives (e.g., water or water mixed with a carbohydrate such as starch) onto an upper surface of a bottom barrier (e.g., a paper-based barrier, such as kraft paper) and distributing a plurality of particulates (e.g., discrete compressed puffed carbohydrate, including starch and cellulose, particulates) about the upper surface of the bottom barrier. The first fluid may hydrate at least some of the particulates that contact the bottom barrier. The plurality of particulates may include one or more insulation materials (e.g., carbohydrates, including polysaccharides such as starch, including vegetable starch, or cellulose). The method may also include directing a second fluid that does not contain external non-water-soluble adhesives (e.g., water or water mixed with a carbohydrate such as starch) onto at least a portion of the plurality of particulates (e.g., between the two or more layers of particulates) to hydrate at least some of the particulates that contact another layer of particulates, and directing a third fluid that does not contain external non-water-soluble adhesives (e.g., water or water mixed with a carbohydrate such as starch) onto one or more of at least a lower surface of a top barrier (e.g., a paper-based barrier, such as kraft paper) and at least a top surface of the final layer of particulates to hydrate at least some of the particulates that contact the top barrier. Further, the method may include positioning the top barrier on top of the plurality of particulates such that the plurality of particulates forms an insulation section disposed between the top barrier and the bottom barrier. The method may also include compressing the insulation section (e.g., formed by the plurality of discrete particulates) and the top and bottom barriers such that at least a portion of the insulation section adheres (e.g., via mechanical adhesion, chemical adhesion, dispersive adhesion, and/or diffusive adhesion) to the top and bottom barriers to form an insulation panel. Depending on the desired size of the insulation panel, the method may further include cutting the insulation panel into a plurality of polygonal sheets. Additionally, the method may include creasing the insulation panel to facilitate conformation inside of a box such that the creases allow the panel to bend at sharp angles.

In yet another aspect, a system for fabricating an insulation panel may include one or more planar roll dispensers configured to dispense a bottom barrier and a top barrier (e.g., paper-based barriers, such as kraft paper). The system may also include one or more hoppers (e.g., vibrating hoppers) positioned above the bottom barrier. The one or more hoppers may be configured to continuously discharge a plurality of particulates onto an upper surface of the bottom barrier at a first discharge rate. The plurality of particulates may include carbohydrate (e.g., polysaccharides such as starch, including vegetable starch, or cellulose) particulates. The system may further include one or more conveyors, which may or may not vibrate, configured to distribute the plurality of particulates about the bottom barrier to form one or more particulate layers. Further, the system may include one or more fluid vaporizers configured to continuously discharge fluid that does not contain external non-water-soluble adhesives (e.g., water or water mixed with a carbohydrate such as starch) onto one or more of the upper surface of the bottom barrier, the plurality of particulates, and a lower surface of the top barrier. The system may also include one or more compression conveyors comprising one or more conveyor belts and one or more compression rollers. The one or more conveyor belts may be configured to feed the top barrier, the one or more particulate layers, and the bottom barrier to the one or more compression rollers, with the one or more compression rollers being configured to compress the top barrier, the one or more particulate layers, and the bottom barrier such that the plurality of particulates self-adhere (e.g., via mechanical adhesion, chemical adhesion, dispersive adhesion, and/or diffusive adhesion) and adhere (e.g., via mechanical adhesion, chemical adhesion, dispersive adhesion, and/or diffusive adhesion) to the top and bottom barriers to form an insulation panel. To create sections that are foldable relative to one another, the method may also include creasing the insulation panel to form two or more sections (or alternatively, three or more sections). In some embodiments, the method may also include scoring the insulation panel and/or excessing portions of the insulation panel to create foldable sections that may be configured to form polygonal forms. Each section may be foldable relative to an adjacent section along the crease or score lines shared between those sections. Depending on the desired size of the insulation panel, the method may further include cutting the insulation panel into a plurality of polygonal sheets. The method may also include applying a water-resistant film or disposing a moisture resistant barrier to form an outer layer over the plurality of polygonal sheets.

In a further aspect, a system for fabricating an insulation panel may include one or more planar sheet dispensers configured to dispense a bottom barrier and a top barrier (e.g., paper-based barriers, such as kraft paper). The system may also include a first fluid vaporizer configured to continuously discharge a first fluid that does not contain external non-water-soluble adhesives (e.g., water or water mixed with a carbohydrate such as starch) onto an upper surface of the bottom barrier. The system may further include one or more hoppers (e.g., vibrating hoppers) positioned above the bottom barrier. The one or more hoppers may be configured to continuously discharge a plurality of primary particulates onto the fluidized upper surface of the bottom barrier. The plurality of particulates may include puffed carbohydrate (e.g., polysaccharides such as starch, including vegetable starch, or cellulose) particulates. The system may also include a second fluid vaporizer configured to continuously discharge a second fluid that does not contain external non-water-soluble adhesives (e.g., water or water mixed with a carbohydrate such as starch) onto the plurality of particulates. The system may further include one or more conveyors configured to distribute the plurality of primary particulates about the bottom barrier to form one or more particulate layers. Further, the system may include a third fluid vaporizer configured to continuously discharge a third fluid that does not contain external non-water-soluble adhesives (e.g., water or water mixed with a carbohydrate such as starch) onto a lower surface of the top barrier. The system may also include one or more compression conveyors having one or more conveyor belts and one or more compression rollers. The one or more conveyor belts may be configured to feed the fluidized top barrier, the one or more particulate layers, and the fluidized bottom barrier to the one or more compression rollers, with the one or more compression rollers being configured to compress the fluidized top barrier, the one or more particulate layers, and the fluidized bottom barrier such that the pluralities of the primary and secondary particulates adhere to one another (e.g., via mechanical adhesion, chemical adhesion, dispersive adhesion, and/or diffusive adhesion) and adhere to the top and bottom barriers (e.g., via mechanical adhesion, chemical adhesion, dispersive adhesion, and/or diffusive adhesion) to form an insulation panel. Hydration from the first, second, and third fluids and/or application of heat may help the particulates self-adhere and adhere to the top and bottom barriers. If the insulation panel is not already sized as desired, the system may include a cutting assembly having one or more cutting blades configured to cut the insulation panel according to one or more predetermined dimensions.

The foregoing summarizes several aspects of the presently disclosed subject matter and is not intended to be reflective of the full scope of the presently disclosed subject matter as claimed. Additional features and advantages of the presently disclosed subject matter are set forth in the following description, may be apparent from the description, or may be learned by practicing the presently disclosed subject matter. Moreover, both the foregoing summary and following detailed description are exemplary and explanatory and are intended to provide further explanation of the presently disclosed subject matter as claimed.

BRIEF DESCRIPTION OF THE DRAWINGS

FIGS. 1A-B show a top isometric view of an insulation panel (FIG. 1A) and a creased and folded insulation panel (FIG. 1B), while FIG. 1C shows a top isometric view of two creased and folded insulation panels and FIG. 1D shows a cutaway side view of a creased and folded insulation panel, in accordance with an exemplary embodiment;

FIG. 7A shows a perspective side view of creasing and cutting subsystems of a panel manufacturing system, in accordance with an exemplary embodiment, while

FIG. 8A is a front isometric view, FIG. 8B is a right side perspective view, and FIG. 8C is a rear isometric view of the panel manufacturing system having a bulk particulate feeding system, in accordance with an exemplary embodiment. FIG. 8D is a zoomed in perspective side view of a feeder subsystem and FIG. 8E is a zoomed in perspective side view of creasing and cutting subsystems of the panel manufacturing system, in accordance with the exemplary embodiment shown in FIGS. 8A-C;

FIG. 11A shows multiple particulates adhered to a first particulate and the bottom barrier, and FIG. 11B omits the multiple particulates to show contact areas between the multiple particulates and the first particulate and the bottom barrier.

DETAILED DESCRIPTION

Figure 1A:
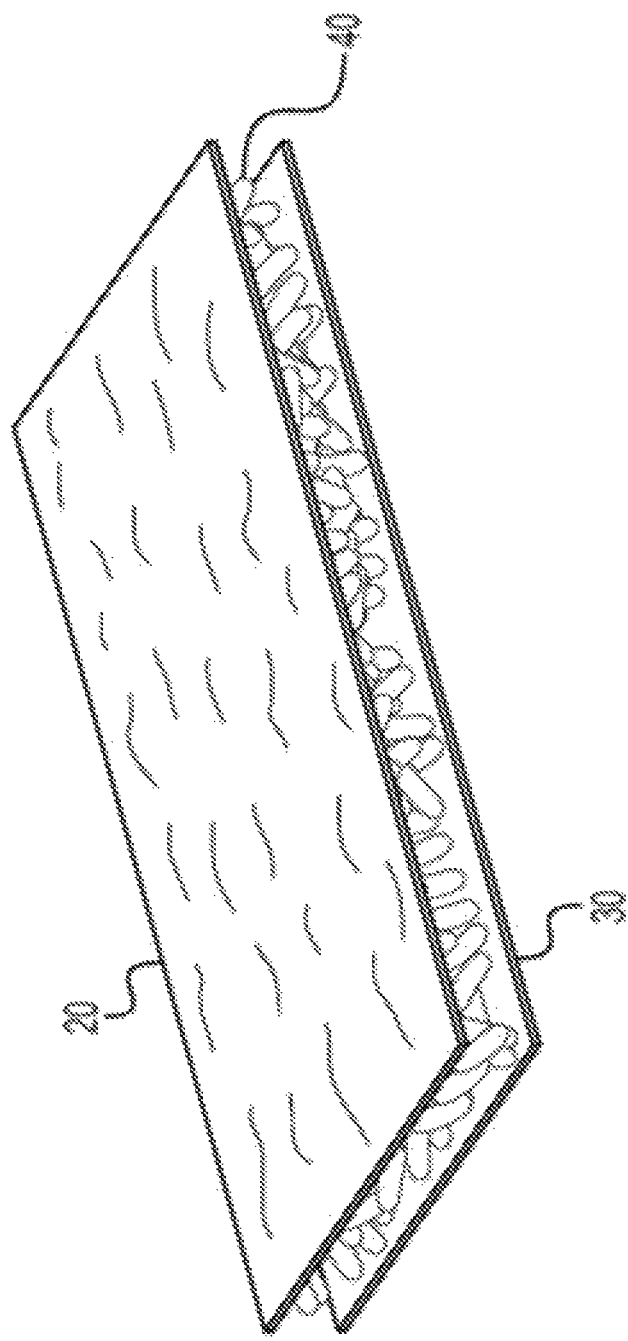

To facilitate an understanding of the principals and features of the disclosed technology, illustrative embodiments are explained below. The components described hereinafter as making up various elements of the disclosed technology are intended to be illustrative and not restrictive.

Embodiments of the disclosed technology include an insulation panel having top and bottom paper-based (e.g., kraft paper, which may be treated or modified to assist in protecting the insulation core layer from moisture) or plastic-based barriers with an insulation core layer having puffed carbohydrate (e.g., polysaccharides such as starch, including vegetable starch, or cellulose) particulates disposed between to the barriers. After the barriers and the particulates are sprayed with fluid that does not contain external non-water-soluble adhesives (e.g., water or water mixed with a carbohydrate such as starch) during manufacturing, the particulates of the insulation core layer may at least partially directly adhere to one another and to the top and bottom barriers via one or more of mechanical adhesion, direct chemical adhesion (e.g., covalent bonds, ionic bonds, hydrogen bonds, or any combination thereof), dispersive adhesion, and diffusive adhesion. Similarly, the particulates of the insulation core layer may at least partially directly adhere to one another and/or to the top and/or bottom barriers via one or more of mechanical adhesion, direct chemical adhesion (e.g., covalent bonds, ionic bonds, hydrogen bonds, or any combination thereof), dispersive adhesion, and diffusive adhesion, or via an adhesive layer (which may work in cooperation with mechanical, chemical, dispersive, and/or diffusive adhesion). With mechanical adhesion, a first particulate may be held in position by being trapped between other particulates of the insulation core layer and/or the paper-based barrier(s), and the paper-based barrier(s) may be held in position by conforming to the contours of one or more particulates after wetting and drying. With direct chemical adhesion, a first particulate may be held in place relative to a second particulate via one or more glycosidic linkages, such as an "O"-glycosidic linkage. With dispersive adhesion or physisorption, a first particulate may bond to the paper-based barrier(s) by van der Waals forces (e.g., the attraction between molecules, each of which have a region of slight positive and negative charge). With diffusive adhesion, molecules in at least a portion of two particulates are soluble in each other and intermingle, thereby joining particles of each particulate into one. The energy applied to the particulates during diffusive adhesion may change the chemistry of the particles of one or more of the particulates in some embodiments and may not alter the chemistry of the particles in other embodiments. The external hydration may aid the bonds formed through one or more of these mechanisms between the particulates and/or between particulate(s) and the paper-based barrier(s). Optionally, the application of heat and/or heat and pressure may also aid the bonds formed through one or more of these mechanisms between the particulates and/or between particulate(s) and the paper-based barrier(s).

The direct chemical adhesion can be via a covalent bond, including, but not limited to, a glycosidic linkage (also referred to interchangeably as a glycosidic bond). A glycosidic bond or linkage is a bond between the hemiacetal or hemiketal group of a sugar or saccharide molecule (e.g., monosaccharide, disaccarid, oligosaccharide, polysaccharide, and the like) to an —OR group, such as a hydroxyl group. A glycosidic bond can also be a bond between the hemiacetal or hemiketal group of a sugar or saccharide and another atom, such as a carbon, nitrogen, sulfur, selenium, and the like. Such bonds may also be referred to as C-glycosides or C-glycosyl compounds (carbon), N-glycosides or glycosylamines (nitrogen), S-glycosides or thioglycosides (sulfur), and selenglycosides (selenium). In an embodiment, the particulates of the insulation core may at least partially adhere to one another and to the top and bottom barriers via a glycosidic linkage. That is, at least a portion of the top surface of the insulation core layer may at least partially adhere to the top barrier and at least a portion of the bottom surface of the insulation core layer may at least partially adhere to the bottom barrier. Although the exemplary embodiments discussed herein refer to glycosidic linkages or bonds, any types of chemical or chemical adhesive bonds (e.g., ionic bonds) are contemplated as well. After being sprayed with fluid and positioned relative to one another, the barriers surrounding the insulation core layer may be compressed in a compression conveyor to fully adhere the particulates to one another and to the top and bottom barriers to form an insulation panel. After compression, the insulation panel may be creased (longitudinally with the feed direction or laterally perpendicular to the feed section) and cut (longitudinally with the feed direction or laterally perpendicular to the feed section) to a predetermined size.

A discharge assembly may discharge a continuous flow of particulates onto the bottom barrier (or directly onto a conveyor in embodiments with no bottom barrier), while a roller assembly unrolls the top and bottom barriers at the appropriate position. Depending on the volume of the discharge assembly and the output capacity of the particulate source (e.g., an extruder), an additional feed system may be used to maintain supply levels. Also helping maintain supply levels, a reclamation system may collect scrap materials from various other systems in the manufacturing process, grind and shred the scrap materials to a predetermined maximum size and shape, and direct the shredded scrap materials back into the feed system.

In another embodiment, the insulation panel includes an insulation core layer having puffed carbohydrate (e.g., polysaccharides such as starch, including vegetable starch, or cellulose) particulates without top and bottom barriers. Optionally, the insulation core layer may include multiple porous layers of puffed carbohydrate particulates that are at least partially adhered directly to one another or separated by one or more dividers (e.g., a plastic sheet), which may be non-porous such that the dividers do not allow moisture to pass through. In some embodiments, the insulation core layer may include multiple porous layers of puffed carbohydrate particulates that are at least partially adhered directly to one another or separated by one or more paper-based barrier dividers (e.g., kraft paper, or treated kraft paper) or one or more plastic barrier dividers. The insulation core layer may be shrink-wrapped or otherwise sealed or treated for moisture resistance in lieu of or in addition to moisture resistance provided by the top and bottom barriers.

After the particulates are sprayed with fluid that does not contain external non-water-soluble adhesives (e.g., water or water mixed with a carbohydrate such as starch) during manufacturing, the particulates may at least partially adhere to one another via one or more of mechanical, chemical (e.g., covalent bonds, ionic bonds, hydrogen bonds, or any combination thereof), dispersive, and diffusive adhesion, and the various mechanisms for adhesion may work in cooperation. The particulates (or layers thereof) may at least partially adhere to one another and/or to one or more dividers via direct mechanical, chemical, dispersive, and/or diffusive adhesion or, in other embodiments, via one or more adhesive layers. The direct chemical adhesion can be via a covalent bond, including, but not limited to, a glycosidic linkage (also referred to interchangeably as a glycosidic bond). A glycosidic bond or linkage is a bond between the hemiacetal or hemiketal group of a sugar or saccharide molecule (e.g., monosaccharide, disaccarid, oligosaccharide, polysaccharide, and the like) to an —OR group, such as a hydroxyl group. A glycosidic bond can also be a bond between the hemiacetal or hemiketal group of a sugar or saccharide and another atom, such as a carbon, nitrogen, sulfur, selenium, and the like. Such bonds may also be referred to as C-glycosides or C-glycosyl compounds (carbon), N-glycosides or glycosylamines (nitrogen), S-glycosides or thioglycosides (sulfur), and selenglycosides (selenium). In an embodiment, the particulates of the insulation core may at least partially adhere to one another and/or to one or more dividers via a glycosidic linkage. That is, at least a portion of the bottom surface of a top layer of particulates may at least partially adhere to the top surface of a bottom layer of particulates and/or the top surface of a divider and, similarly, the top surface of a bottom or lower layer of particulates may at least partially adhere to the top layer and/or a divider. Although the exemplary embodiments discussed herein refer to glycosidic linkages or bonds, any types of chemical or chemical adhesive bonds are contemplated as well. After being sprayed with fluid and positioned relative to one another, the insulation core layer may be compressed in a compression conveyor to fully adhere the particulates to one another to form an insulation panel. After compression, the insulation panel may be creased (longitudinally with the feed direction or laterally perpendicular to the feed section) and cut (longitudinally with the feed direction or laterally perpendicular to the feed section) to a predetermined size. Additionally, the insulation panel may be shrink-wrapped or otherwise sealed or treated for moisture resistance. The one or more dividers may help layers of particulates adhere to one another and provide structural support or moisture resistance to at least a portion of the insulation panel. By including multiple layers of particulates, which can have different sizes, shapes, densities, and materials, allow for the insulation panel to be customized for a particular application.

The resulting insulation panels of the embodiments described herein have particular applicability in shipping containers, such as the expandable shipping container disclosed in the U.S. Provisional Patent Application No. 62/491,651 filed Apr. 28, 2017, the subject matter of which is incorporated herein by reference. For example, embodiments of the insulation panel disclosed herein may be used to form one or more panels and/or flaps within a shipping container. One exemplary advantage of using exemplary embodiments of the disclosed insulation panels is that they can be one or more of (or all of) repulpable, curbside recyclable, grease-and-water-resistant, and moisture-resistant because one or more of (or all of) its top and bottom barriers and foamed particulate layer can have those characteristics. In some embodiments, the insulation panel is also compostable and biodegradable.

Referring now to the figures, in which like reference numerals represent like parts, various embodiments of the disclosure will be disclosed in detail.

In some embodiments, as shown in FIGS. 1A-D and FIG. 2A, an insulation panel 10 may have a top barrier 20 and a bottom barrier 30 adjacent the top and bottom surfaces, respectively, of a foamed particulate layer 40. In other embodiments, insulation panel 10 may have foamed particulate layer 40 without top barrier 20 and/or bottom barrier 30 (as shown in FIG. 2B) or multiple foamed particulate layers 40 separated by one or more dividers 50 (as shown in FIG. 2C), though it is contemplated that multiple foamed particulate layers 40 may be stacked without dividers. Foamed particulate layer 40 may be formed from discrete expanded particulates of any type, including, for example, foamed or puffed discrete particulates. For exemplary purposes herein, particulate layer 40 is discussed as a foamed particulate layer. Top barrier 20 and bottom barrier 30 may be thin, paper-based barriers, such as kraft paper, machine glazed (MG) paper, smooth finished (SF) paper, machined finished (MF) paper, glassines, and/or supercalendered kraft (SCK) paper. In some embodiments, the paper weight of top barrier 20 and bottom barrier 30 ranges from 10# to 70#, and from 20# to 60# in other embodiments, and from 15# to 30# in further embodiments, though other weight ranges are contemplated. Top barrier 20 and bottom barrier 30 may be porous and one or more of repulpable, curbside recyclable, supercalendered, grease-and-water-resistant, kraft paper, machine glazed (MG) paper, smooth finished (SF) paper, machined finished (MF) paper, glassines, and/or supercalendered kraft (SCK) paper. Top barrier 20 and/or bottom barrier 30 may optionally include a laminant or coating to improve water-resistance. In some embodiments, to meet the OCC-E protocol developed by the Fiber Box Association, a laminant or coating included on top barrier 20 and/or bottom barrier 30 is repulpable and curbside recyclable. Foamed particulate layer 40 may at least partially chemically adhere directly to top barrier 20 and bottom barrier 30 via a covalent bond, including, but not limited to, a glycosidic linkage, and such linkage(s) may be aided by the application of moisture and/or heat during the manufacturing process. In some embodiments, some surface areas of one or more of foamed particulate layer 40, top barrier 20, and bottom barrier 30 that have been hydrated and/or heated beyond a predetermined threshold during manufacturing may have one or more covalent bonds (e.g., a glycosidic linkages) formed (e.g., between contacting surface areas of the foamed particulate layer and top barrier 20 when one or more of those surfaces areas has been hydrated or heated), while no such covalent bonds are formed within un-hydrated and un-heated surface areas of foamed particulate layer 40, top barrier 20, and bottom barrier 30. In this fashion, a first surface area region of foamed particulate layer that contacts a first surface area region of top barrier 20 may form one or more bonds if one or more of the first surface area regions are sufficiently hydrated and/or heated. In contrast, a second surface area region of foamed particulate layer that contacts a second surface area region of top barrier 20 may not have any bonds formed if one or more of the second surface area regions are sufficiently hydrated and/or heated (e.g., even if the second surface area regions are adjacent to the bond-containing first surface area regions). Bookending at least top and bottom surfaces of foamed particulate layer 40 between top barrier 20 and bottom barrier 30 can provide several advantages over foamed particulate layer 40 alone, including providing a printable surface, a barrier to airflow and thermal transfer, and a barrier to moisture and liquid intrusion (thereby also preventing damage to foamed particulate layer 40).

Figure 1B:
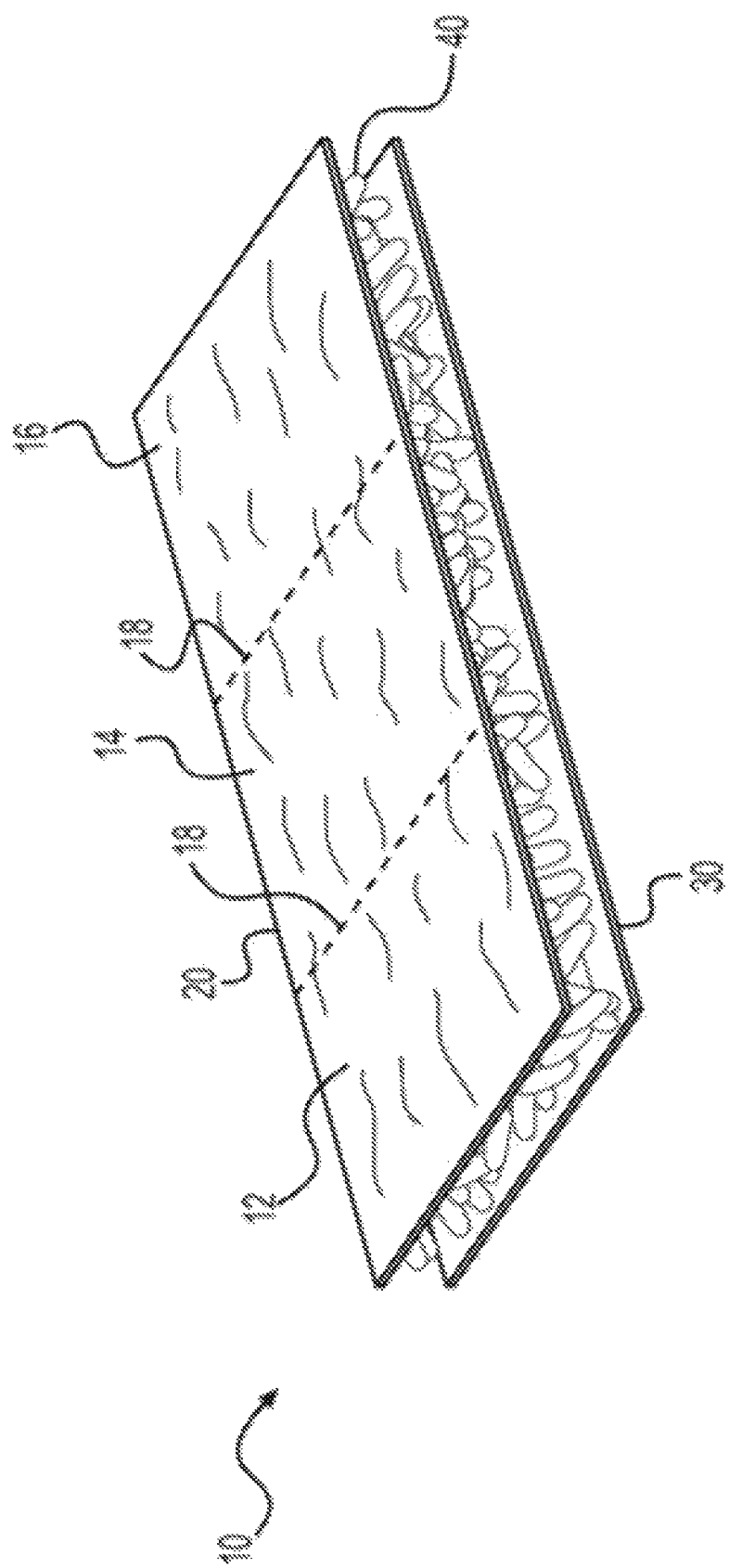
Figure 1D:
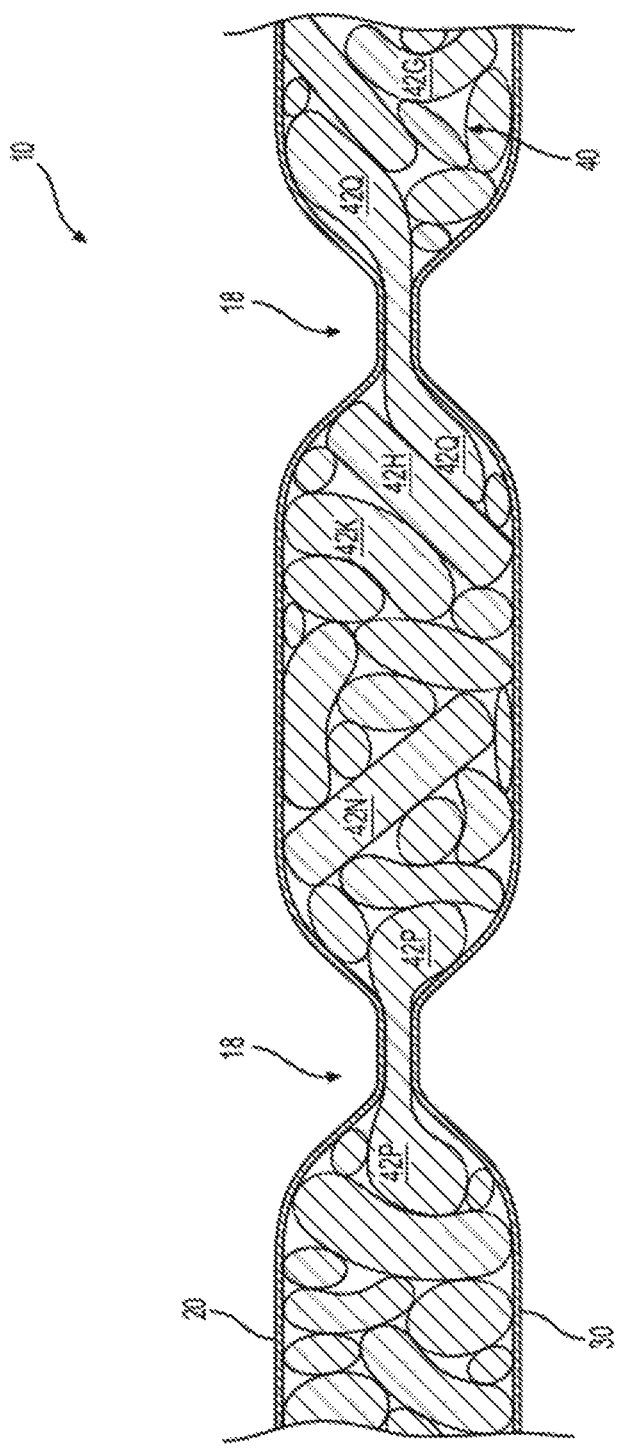
Figure 2A:
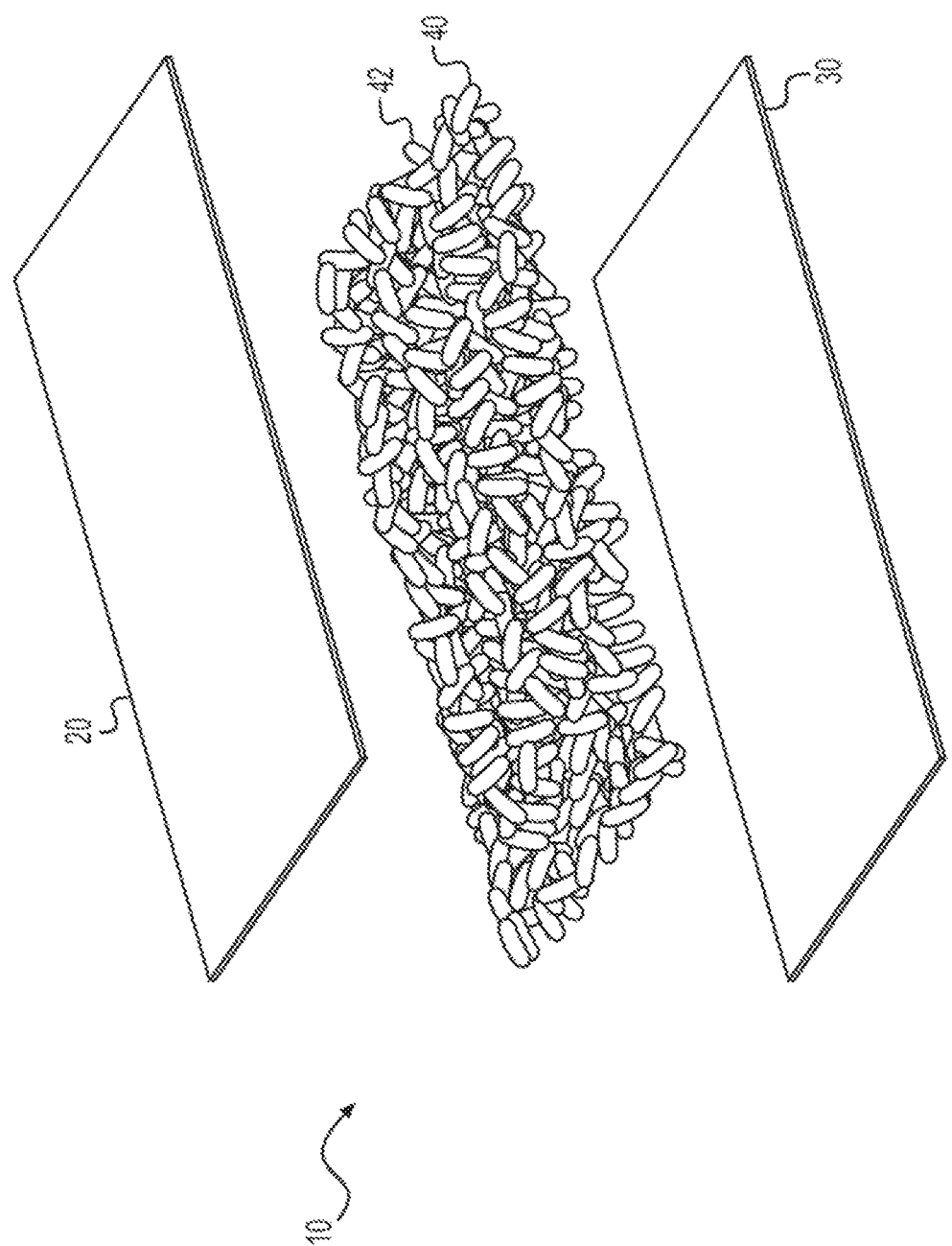
FIGS. 2A-E show additional details of exemplary insulation panel(s), with FIG. 2A showing an exploded view of an insulation panel in accordance with the exemplary embodiment shown in FIGS. 1A-C, FIGS. 2B-C showing exploded views of an insulation panel formed without top and bottom barriers and having a single foamed particulate layer (FIG. 2B) and multiple foamed particulate layers separated by a divider (FIG. 2C) in accordance with other exemplary embodiments, FIG. 2D showing examples of different foamed particulate shapes in accordance with various embodiments, and FIG. 2E showing a cutaway side view of an insulation panel having various types of bonding interfaces between top and bottom barriers and foamed particulate(s) in accordance with some embodiments.
Figure 2B:
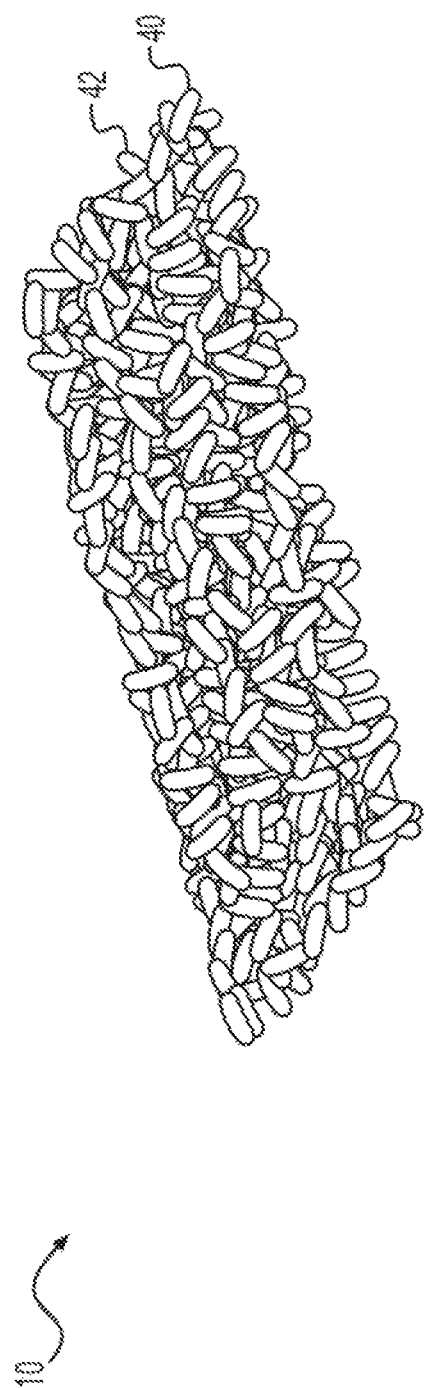
Figure 2C:
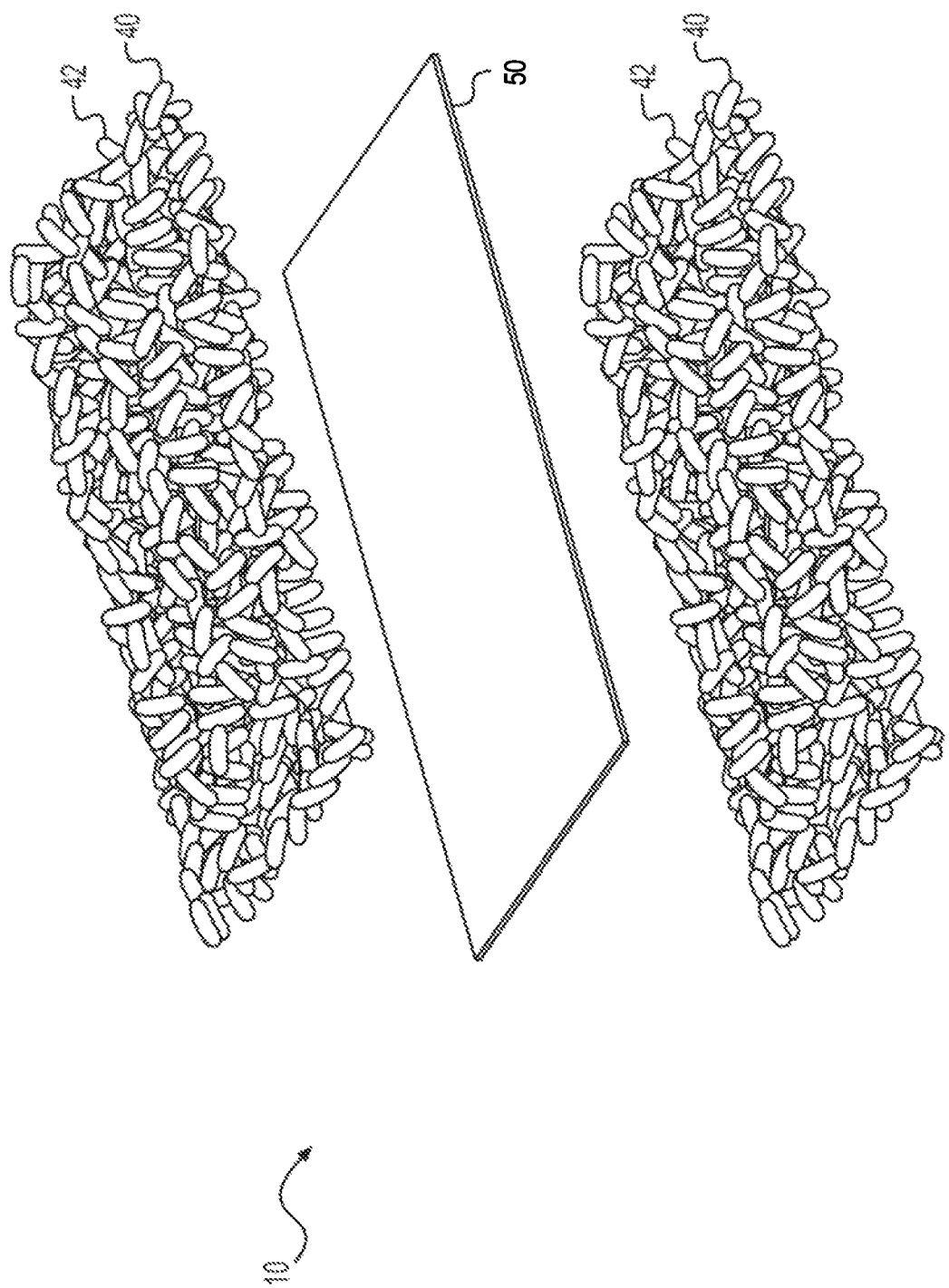

Insulation panel 10 shown in FIGS. 1A-D, and similarly the embodiments of insulation panel 10 shown in FIGS. 2B-C, may be creased (e.g., by a creasing assembly) such that insulation panel 10 has multiple sections (e.g., three, four, or more) separated by creases (e.g., two, three, or more), as shown in FIGS. 1B-D. When insulation panel 10 has three sections separated via two creases, two insulation panels 10 may form complimentary halves with one another and collectively form a six-sided shape (e.g., a first insulation panel 10 forming left, front, and right faces and a second insulation panel 10 forming bottom, back, and top faces). Alternatively, when insulation panel 10 has four sections separately via three creases, it may form front, left, right, and back faces on its own and be optionally combined with a separate bottom and/or top face. The sections are foldable relative to one another along the creases, with the extent of rotation being based upon the depth and angle of the creases. Creasing may be achieved through the application of humidity, heat, pressure, heat and pressure, and/or high-frequency acoustic vibration (ultrasonic welding). Creasing of insulation panel 10 allows for a segmented panel that can bend without creating internal stress of compression or tension, which could otherwise rupture the bonds between particles and surface materials resulting in delamination. As pressure alone may not permanently deform and set the starch structure of insulation panel 10, creasing may help to retain a desired indentation or shape in the starch structure of insulation panel 10 for enhanced practicality and end-use. At the resulting creasing interface, the starch structure may have a higher density than the bulk density of insulation panel 10. In some embodiments, as shown in FIG. 1C, the sections are foldable relative to one another along creases up to about 90°. In this fashion, two insulation panels 10 may be oriented relative to one another as shown in FIG. 1C to cover six sides of a rectangular or cubic box for placement within an expandable container (e.g., the expandable shipping container disclosed in the U.S. Provisional Patent Application No. 62/491,651). Insulation panel 10, with or without top and bottom barriers 20, 30, may be sized (e.g., formed, cut and creased) to fit within an expandable container or other application. For example, in some embodiments, insulation panel 10 has a minimum length of about 4", a minimum width of about 4", and a minimum thickness of about 0.1".).

As shown more clearly in FIGS. 2A-C, foamed particulate layer 40 is made from a plurality of foamed particulates 42, such as, for example, discrete compressed puffed carbohydrate (e.g., polysaccharides such as starch, including vegetable starch, or cellulose) particulates. While referred to herein as discrete foamed particulates 42, any type of expanded or puffed particulate is contemplated for purposes herein. Foamed particulates 42 used in foamed particle layer vary in diameter between about 0.125" and 6.0" in some embodiments, and between about 0.5" and 2.0" in other embodiments. One or more of the plurality of voids between the foamed particulates 42 that make up particulate layer 40 may be partially filled with one or more of a cellulose filler and a shredded paper filler. In some embodiments, foamed particulates 42 include at least about 20% by dry-basis weight starch polysaccharides and the remainder is formed from a mixture of one or more of non-starch polysaccharides, poly-vinyl alcohol (PVA), water (e.g., 0-10% by weight, specifically about 5% by weight in some embodiments), colorants, additives, rheology agents, additives of lignocellulosic origin, water-soluble adhesives (e.g., a water-soluble glue, starch, or tacky material, which may be mixed into water or another liquid), plasticizers, hydrophobic agents, nucleating agents, and other inert fillers. In other embodiments, foamed particulates 42 include less than about 95% starch (e.g., vegetable starch), as limiting the weight percentage of starch under 95% helps enable insulation panel 10 to bend without snapping or breaking, thereby assisting with resiliency. In further embodiments, foamed particulates 42 include no more than about 85% starch (e.g., vegetable starch) to further increase the resiliency of the foamed particulates 42. The starch content of foamed particulates 42 may help facilitate it being able to adhere to paper and other materials. The irregular shape of the discrete particulates may provide thermal protection in the event that insulation panel 10 breaks because the uneven surface of the irregularly shaped particulates formed by the mating contact surfaces on each side of the break would impede thermal transfer more effectively than flat contact surfaces of a "clean" break.

Figure 2D:
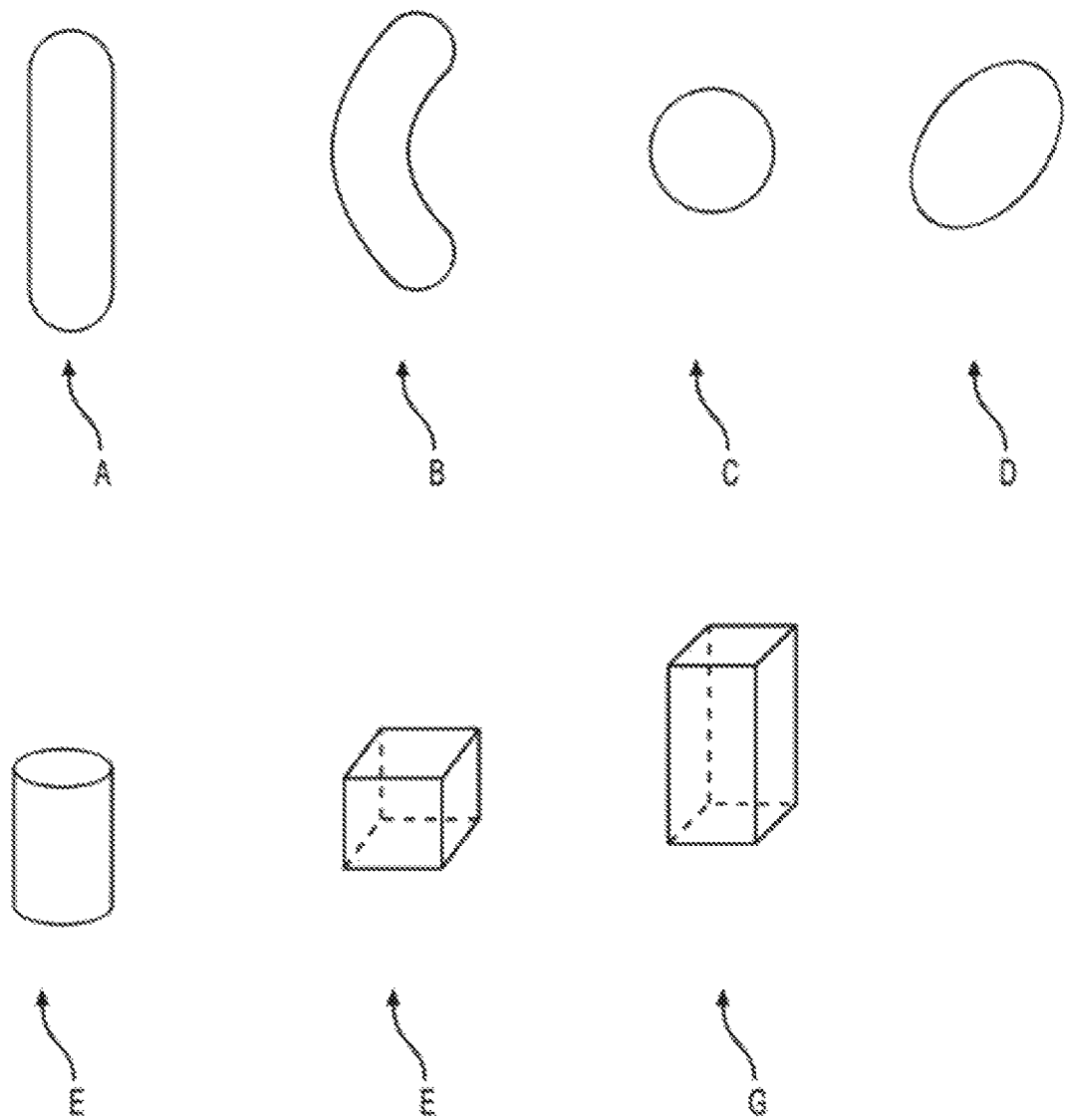

In some embodiments, foamed particulates 42 used in foamed particle layer 40 vary in diameter of their longest cross-section between about 0.125" and about 6.0" and may also have a circular to lenticular cross-sectional shape in some embodiments to form a generally tubular (whether hollow or non-hollow) body. While some foamed particulates 42 may be tubular and generally straight along their length (e.g., foamed particulates 42H and 42N in FIG. 1D), others may be tubular and deformed along their length (e.g., foamed particulates 42G and 42K in FIG. 1D). In other embodiments, the shortest cross-sectional dimension of each of foamed particulates 42 is less than about 6.0" prior to forming foamed particulate layer 40. Using discrete foamed particulates 42 also advantageously allows for an integral foamed particle layer 40 (e.g., not formed by adhering multiple layers together and trimming to a desired size/shape) having any desired shape and size regardless of dimensions selected during extrusion and without any waste material from having to trim insulation panel 10 to the desired shape or size. The extrusion process may include adding a low-thermal conductivity gas (e.g. carbon dioxide, argon, xenon, etc.), which may yield lower-thermal conductivity foamed particulates 42 than would result from using only air. In some embodiments, foamed particulates 42 used in foamed particulate layer 40 may be substantially uniform in one or more of size and shape, and may be substantially uniform or vary in size and shape across multiple foamed particulate layers 40. For example, as shown in FIG. 2D, particulates 42 may be formed into various shapes, including a straight tubular shape A, a curved tubular shape B, a spherical shape (with circular cross-section) C, a spheroid shape (with ovular and/or lenticular cross-section) D, a cylindrical shape E, a cubic shape F, and a cuboid (e.g., a rectangular cuboid or non-rectangular cuboid) shape G. Larger shapes may be easier to process as less parts need to be adhered to one another. The size and shape of particulates 42 may be selected in order to (i) minimize material usage, (ii) allow for even density distribution post compression (i.e., orientation agnostic shapes) and tight dimensions, and/or (iii) allow for maximum adhesion (particulates 42 having larger contacting surface areas would aid adhesion) depending on the thermal and protective needs for a particular application or product. Additionally, in some embodiments, multiple batches of particulates 42 of various sizes and/or shapes may be used (e.g., with a first batch of 2" spherical particulates 42 laid down to ensure good adhesion to the top and/or bottom barriers 20, 30, followed by a second batch of 0.25" generally cylindrical particulates 42 to fill in spaces between particulates 42 of the first batch and even the density distribution). Using multiple batches of particulates 42 of various sizes and/or shapes may allow for a more functional (e.g., better thermal and/or protective properties) result than using a single shape and size of particulates 42, while using particulates 42 of a single shape and size may be easier and less expensive to manufacture. Regardless of the exterior shape of the particulates 42, one or more particulates 42 may be hollow to decrease the amount of materials needed and, in turn, reduce costs. In other embodiments, non-hollow particulates 42 and/or filled particulates 42 (e.g., hollow particulates 42 filled with another material) may provide a higher particle density and, in turn, increase strength and other mechanical properties needed in protective packaging. Particulate shape may be selected in order to provide one or more qualities of low packing density (e.g., of the insulation panel 10), high volume to weight ratio (e.g., of the particulates 42), high surface area to weight ratio (e.g., of the particulates 42), and consistent distribution and particle density (e.g., of the insulation panel 10). Foamed particulates 42 may have particle densities varying from about 0.2 to about 2.0 pounds per cubic foot, more particularly about 0.4 to about 0.9 pounds per cubic foot in some embodiments, before forming foamed particulate layer 40, and may be substantially uniform or vary in density across multiple foamed particulate layers 40. In some embodiments for products or applications that require a precise level of quality control and/or consistency (e.g., for thermal and/or protective applications), smaller particulates 42 and/or particulates 42 having at least two 90° offset circulate cross sections (e.g., spherical, lenticular, etc.) so that they can be dropped in at any orientation while achieving a more consistent density distribution.

Figure 2E:
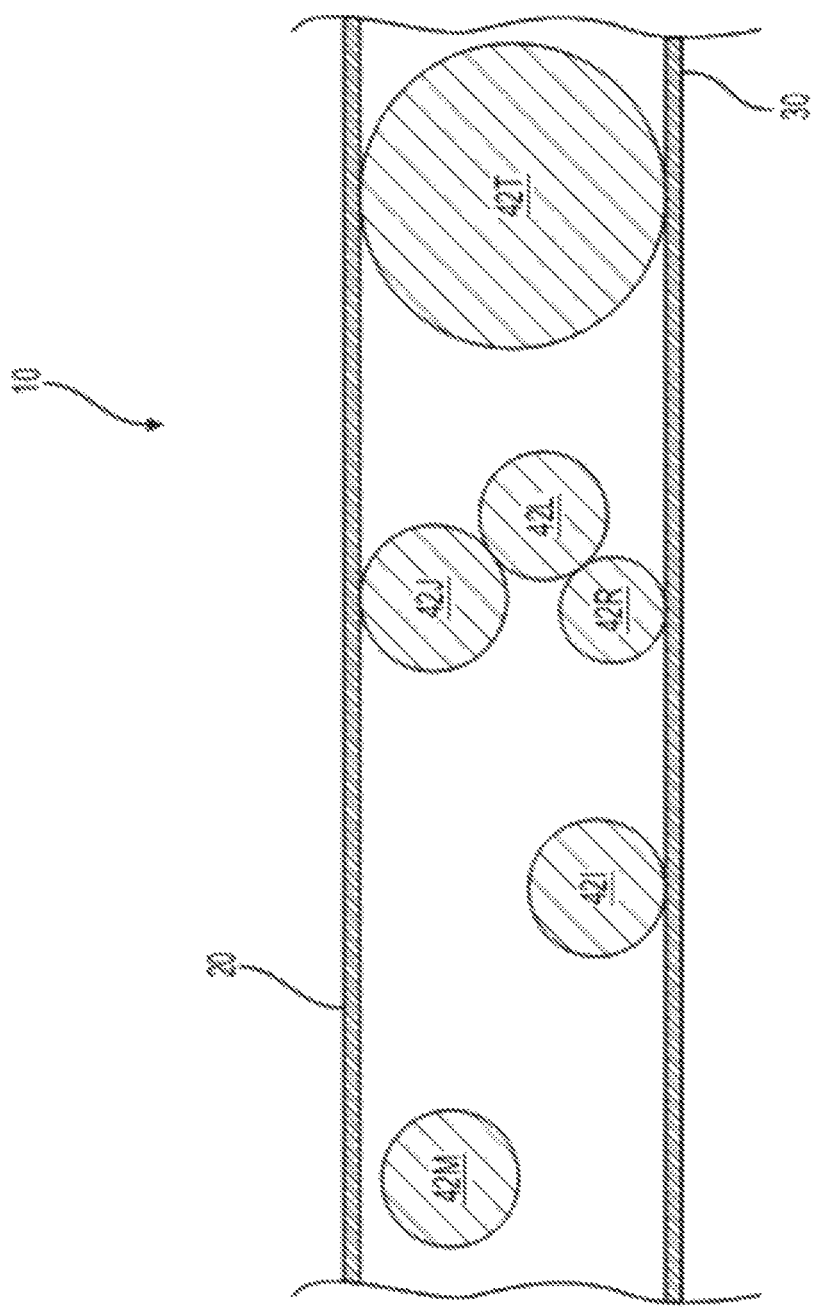

To form foamed particulate layer 40, foamed particulates 42 may form various types of bonding interfaces. For example, as shown in FIG. 2E, a bonding interface might be formed between: (i) top barrier 20 and particulate 42M, (ii) bottom barrier 30 and particulate 42I, (iii) top barrier 20, bottom barrier 30, and particulates 42J, 42L, and 42R, and (iv) top barrier 20, bottom barrier 30, and particulate 42T. Bonding interfaces may also be formed between individual foamed particulates 42 (e.g., as shown by particulates 42J, 42L, and 42R in FIG. 2E). Different types of adhesion may be possible at the various bonding interfaces, including direct chemical bonds forming glyosidic linkage(s) at the bonding interfaces.

Figure 11A:
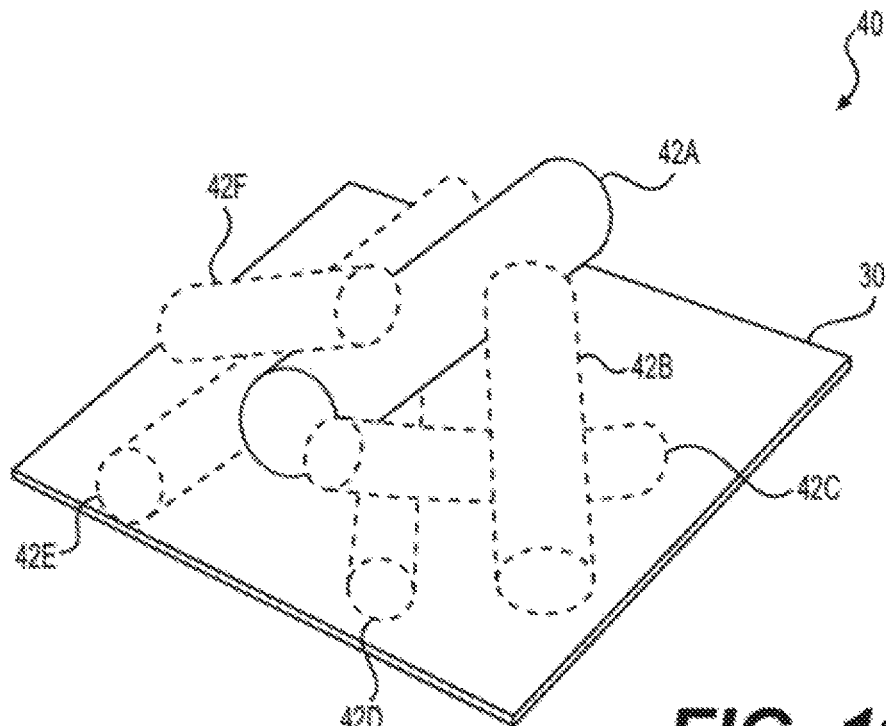
FIGS. 11A-B are front isometric views showing contact areas between multiple foamed particulates and a bottom barrier of an insulation panel, according to an exemplary embodiment. Specifically.
Figure 11B:
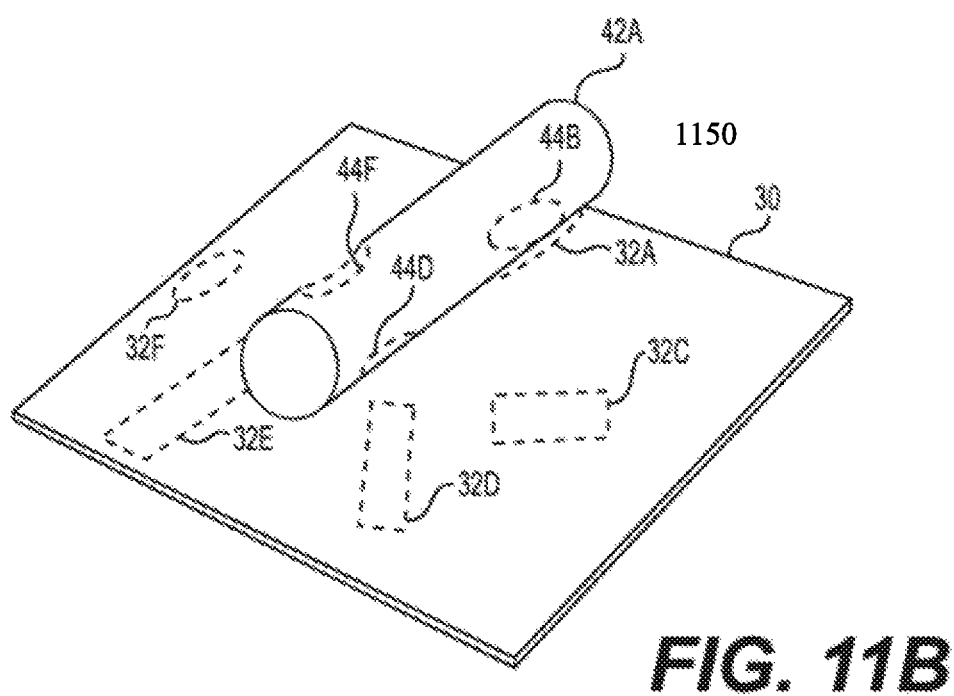

To form foamed particulate layer 40, foamed particulates 42 may also at least partially adhere to one another and collectively define a plurality of voids to create a bonded, semi-rigid structure of foamed particulate layer 40. For example, as shown in FIGS. 11A-B, the foamed particulates 42 may at least partially adhere to one another by application of adhesive formulations or by polymerization reactions between the polysaccharide components within foamed particulates 42 forming linkages between foamed particulates 42, and the linkages formed may be aided by external hydration and/or application of heat beyond a predetermined threshold during the manufacturing process. That is, a particulate 42A may at least partially adhere to particulates 42B, D, and F at bonded areas 44B, D, and F, respectively. Bonded areas 44B, D, and F correspond with surfaces areas of particulates 42A, B, D, and F were hydrated and/or heated beyond the predetermined threshold during manufacturing, while other contacting surface areas between particulate 42A and particulates 42B, D, and F were not hydrated and/or heated beyond the predetermined threshold during manufacturing and thus did not form a bonded area. Similarly, a particulate 42C is shown as not having a bonded area formed with particulate 42A, which may have been caused because the contacting surface areas between particulates 42A and C were not hydrated during manufacturing. The linkages formed between foamed particulates 42 and top and bottom barriers 23, 30 may similarly be aided by external hydration and/or application heat beyond a predetermined threshold during the manufacturing process. Returning to FIGS. 11A-B, particulates 42A and C-F form bonded areas 32A and C-F with bottom barrier 30. The bonded areas do not necessarily extend the entire contact surface area between a particulate 42 and top or bottom barriers 20, 30. For example, only a portion, which may have been hydrated and/or heated during manufacturing, of the contact surface area between particulate 42D and bottom barrier 30 forms bonded area 32D. Similarly, even though particulate 42B contacts particulate 42A and bottom barrier 30, only bonded area 44B is formed with particulate 42A as shown. Selectively hydrating and/or heating portions of particulates 42 during the manufacturing process may achieve (i) a desired bond strength (e.g., based on the number and size of the bonded areas) between the particulates 42 and one another as well as between the particulates 42 and top and bottom barriers 20, 30, and (ii) a desired flexibility of the overall insulation panel 10 (e.g., by not bonding every contact surface between the particulates 42 and one another as well as between the particulates 42 and top and bottom barriers 20, 30. By using a plurality of discrete foamed particulates 42, the density of insulation panel 10 (density of particulates 42 multiplied by the percentage of non-void space making up insulation panel 10) can be customized as desired, and may be lower than the density of a solid sheet of starch foam. This lower density can provide several advantages, including using less material without sacrificing thermal performance because panel thickness, the controlling factor in thermal performance, remains the same. Additionally, by using less material, insulation panel 10 also weighs less than designs requiring a higher density, an important consideration for shipping containers. In exemplary embodiments, insulation panel 10 may have a density from about 0.025 to about 40.0 pounds per cubic foot (calculated using the image J test through a front-to-back cross-section extending through top and/or bottom barriers), more particularly about 0.01 to 2.0 pounds per cubic foot and a thickness between about 0.001 to about 10 inches, more particularly about 0.25 to about 2.0 inches. Insulation panel 10 may be formed with between about 20% to 80% voids, more particularly about 30% to 60% voids.

In additional to decreasing density of insulation panel 10, a higher void percentage also provides increased space for filler materials (e.g., cellulose filler, which may be wetted, recycled trim material from manufacturing insulation panel 10). The plurality of voids defined by foamed particulates 42 may be filled with a solid or fluid or alternatively left empty (e.g., filled with ambient air). For example, one or more of the plurality of voids between the foamed particulates 42 that make up foamed particulate layer 40 may be partially filled with one or more of a cellulose filler and a shredded paper filler. Alternatively, one or more of the plurality of voids may be at least partially filled with one or more of materials of lignocellulosic origin, moisture scavenging agents, odor absorbing agents, phase-change agents, and other inert fillers.

Creasing insulation panel 10, as shown in FIGS. 1B-D can also impact the density within creased sections of insulation panel. For example, as shown in FIG. 1D, one or more particulates 42 (e.g., particulates 42P, Q) may be at least partially deformed by the creases 18, and the resulting deformed shapes may increase the size of the contacting surface areas between the particulates 42 and between particulates 42 and top and bottom barriers 20, 30. Heat applied during the creasing step may also help aid in forming a higher concentration of bonded areas proximate the creases 18 and to help the insulation panel 10 to better retain its shape long term compared to creasing without applying external heat. In some embodiments, the application of heat during creasing may cause at least some of the intrinsic moisture within one or more particulates 42 to vaporize, thereby altering the structure of those particulate(s) and hydrating portions of the starch structure to cause further adhesion. In some embodiments, creasing may involve applying about 100° C. of external heat and about 1000 pounds of force at a pressure of about 60-100 psi (pounds per square inch). In some embodiments, the application of heat and/or heat and pressure may cause the particulates 42 to thermoset at the location of the crease 18. To retain thickness when pressure is removed, in other embodiments, ultrasonic creasing may be performed in order to help the insulation panel 10 to better retain its shape long term without applying external heat. Ultrasonic creasing may involve vibrating atoms within the insulation panel 10 during creasing. Creasing may also be used to create side seams on a panel or enclosed pockets between layers (e.g., layers of particulates 42 and/or top and bottom barriers 20, 30) to enclose bonded or unbonded particulates 42 trapped by creased seams. For example, as shown in FIG. 1D, one or more particulates 42 (e.g., particulates 42H and 42K) may be free-floating such that they are not bonded to other particulates 42 or to top or bottom barriers 20, 30, but are held in place, directly or indirectly, by the creases 18.

When insulation panel 10 includes multiple foamed particulate layers 40, as shown in FIG. 2C, foamed particulates 42 in each layer 40 may at least partially adhere to particulates 42 of another layer 40 and/or to upper and lower surfaces of divider 50, respectively. Divider 50 may be a non-porous material (e.g., a plastic sheet), and may be properties as desired based on the final application of insulation panel 10. For example, divider 50 may structurally support foamed particulate layers 40, provide moisture protection or thermal conductivity resistance between foamed particulate layers 40, or separate different foamed particulate layers 40 during manufacturing. In some embodiments, divider 50 may be a paper-based barrier as described herein.

In some embodiments, insulation panel 10 may be at least partially shrink-wrapped or otherwise sealed by a protective outer barrier (not shown). For example, the semi-rigid structure of foamed particulate layer(s) 40 may be at least partially adhered to the outer barrier via application of adhesive formulations or by direct mechanical fusion to the surfaces of the material layers or by chemically and/or mechanically adhering the outer barrier to the material layer. The outer seal may include one or more layers of porous and/or non-porous materials and may be bonded to and/or imbedded within the semi-rigid structure of foamed particulate layer(s) 10. For example, in some embodiments, the outer seal may consist of lignocellulosic materials such as but not limited to uncoated paper, clay or chemically coated one- and two-sided paper, polymer-coated or laminated one- and two-sided paper, uncoated corrugated substrates of one or more layers, wax or chemically coated corrugated substrates of one or more layers, and polymer-coated corrugated substrates of one or more layers. In other embodiments, the outer seal may consist of polymeric materials including but not limited to films, mesh screens, non-woven substrates, and rigid polymeric structures. In further embodiments, the outer seal may consist of metal surfaces including but not limited to metal foils, mesh screens, solid metal sheets, and polymers with metalized surfaces.

Similarly, in some embodiments, insulation panel 10 may be at least partially enveloped in a protective sheath (not shown), which may include porous or non-porous materials (e.g., plastic, kraft paper, treated materials for moisture resistance, etc.) and provide structural support to insulation panel 10. The sheath may envelope insulation panel 10 in cooperation with the outer seal. Unlike the outer seal, however, it is contemplated that the sheath is not adhered to the semi-rigid structure of foamed particulate layer(s) 40 in some embodiments. In other embodiments, the sheath may be at least partially adhered directly to insulation panel 10 or to the outer seal via application of adhesive formulations or by direct mechanical fusion to the metal surfaces of the material layers of the outer seal or by chemically and/or mechanically adhering the outer barrier to the material layer. In some embodiments, the sheath may consist of lignocellulosic materials such as but not limited to uncoated paper, clay or chemically coated one- and two-sided paper, polymer-coated or laminated one- and two-sided paper, uncoated corrugated substrates of one or more layers, wax or chemically coated corrugated substrates of one or more layers, and polymer-coated corrugated substrates of one or more layers. In other embodiments, the sheath may consist of polymeric materials including but not limited to films, mesh screens, non-woven substrates, and rigid polymeric structures. In further embodiments, the sheath may consist of metal surfaces including but not limited to metal foils, mesh screens, solid metal sheets, and polymers with metalized surfaces.

Figure 3:
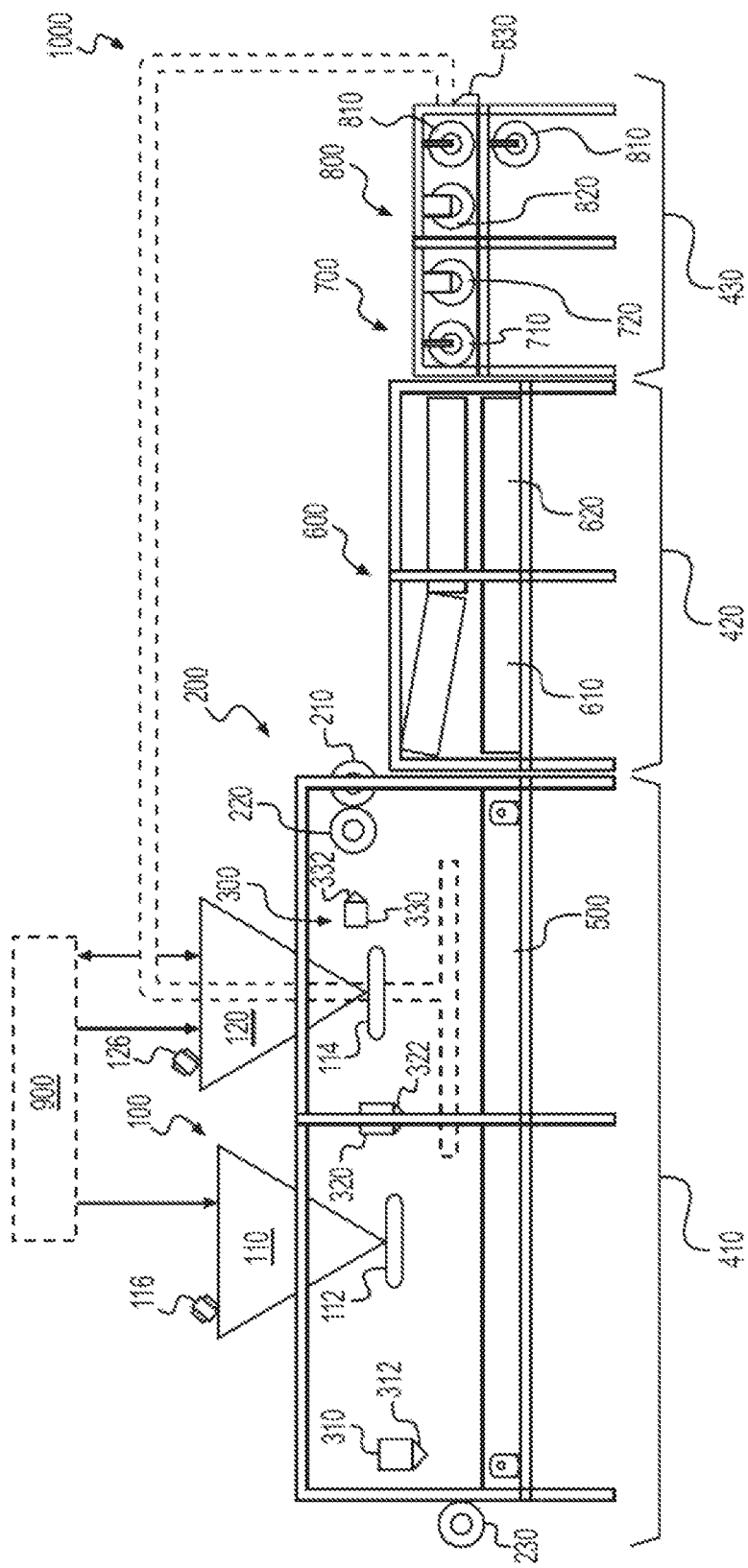
FIG. 3 shows a side view of a panel manufacturing system, in accordance with an exemplary embodiment.

FIG. 3 shows an exemplary embodiment of a panel manufacturing system 50 used to manufacture insulation panels 10. Panel manufacturing system 50 may include a feeding section having a hopper assembly 100, a roller assembly 200, a fluid discharge system 300, and a feeding conveyor 500, a compression section having a compression conveyor 600, and a discharge section having a creasing system 700 and a cutting system 800. Panel manufacturing system 50 may be operatively supported by support structure 400, with a feeding section structure 410 supporting the feeding section, a compression section structure 420 supporting the compression section, and a discharge section structure 430 supporting the discharge section.

Figure 4:
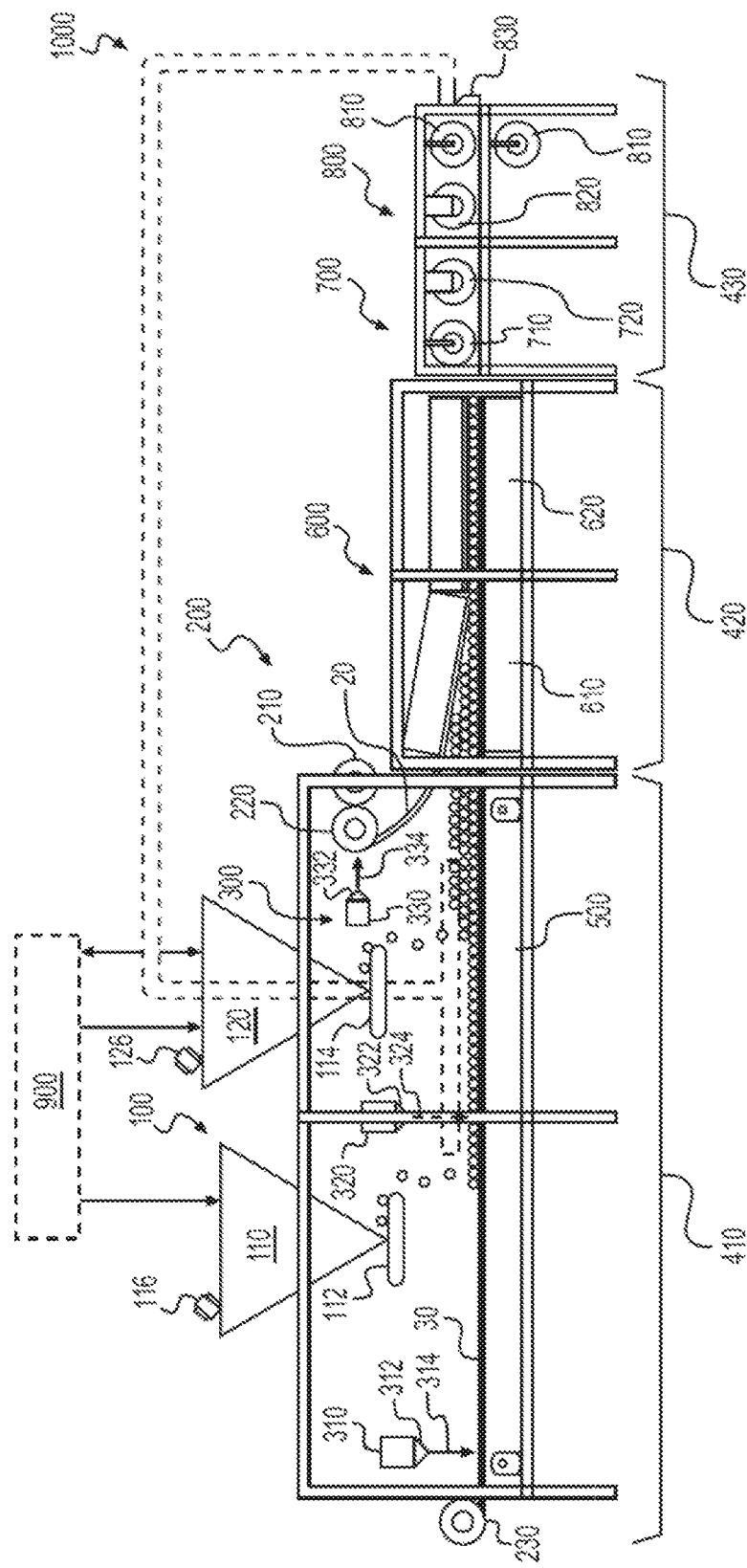
FIG. 4 shows a side view of a panel manufacturing system in operation, in accordance with an exemplary embodiment.

Within the feeding section, discharge assembly (e.g., hopper assembly 100) is configured to dispense foamed particulates 42 received from a particulate feeder 900, and roller assembly 200 is configured to dispense material for top and bottom barriers 20, 30 used to create insulation panel 10, as shown in FIG. 4. Particulate feeder 900 may include one or more extruders, a bulk particulate feeding system (e.g., as shown in FIGS. 8A-E), or any suitable source of particulates 42. Fluid discharge system provides fluid to, in combination with compression from compression conveyor 600, facilitate foamed particulates 42 adhering to one another and to top and bottom barriers 20, 30. Feeding conveyor 500 is configured to receive and direct barrier material for bottom barrier 30 and foamed particulates 42 to compression conveyor 600, which also receives barrier material for top barrier 20 from roller assembly 200. In turn, compression conveyor 600 compresses foamed particulates 42 and the barrier materials together, which may be performed without applying external heat in some embodiments, and directs the compressed materials to creasing system 700 and cutting system 800 for creasing and cutting the compressed materials into individual insulation panels 10. Panel manufacturing system 50 may optionally have a reclamation system 1000 for reclaiming scrap materials from the feeding section and/or the creasing and cutting section that would otherwise be discarded and sending the scrap materials to particulate feeder 900 or directly to hopper assembly 100.

Figure 5:
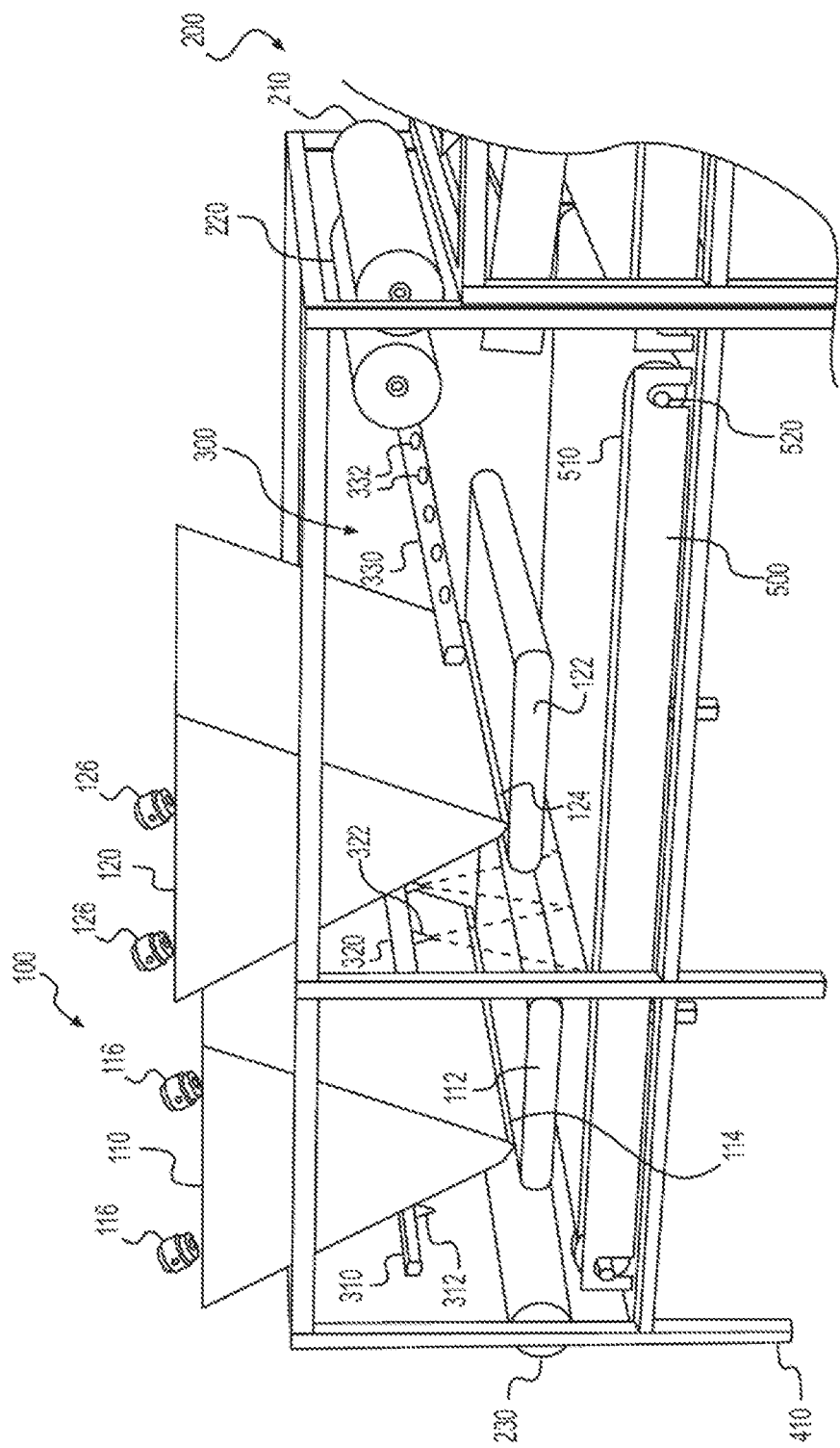
FIG. 5 shows a perspective side view of a feeder subsystem of a panel manufacturing system, in accordance with an exemplary embodiment.

FIG. 5 shows the exemplary embodiment of the feeding section of panel manufacturing system 50 from FIGS. 3-4 in greater detail. Supported by feeding section structure 410, hopper assembly 100 includes a first hopper 110 positioned above an upstream portion of feeding conveyor 500 and a second hopper 120 positioned above a middle portion of feeding conveyor 500. Both first hopper 100 and second hopper 120 contain foamed particulate 42, which may be supplied by a particulate source, such as particulate feeder 900 as shown in FIG. 4. Although hopper assembly 100 is described herein as having two hoppers 110, 120, in some embodiments a hopper assembly 100 may include only a single hopper, or, alternatively may have more than two hoppers. Returning to the embodiment shown in FIG. 4, first hopper 110 and second hopper 120 dispense foamed particulates 42 via an outlet 114 onto a first distribution conveyor 112 and via an outlet 124 onto a second distribution conveyor 122, respectively, for subsequent distribution onto bottom barrier 30 below. First distribution conveyor 112 and second distribution conveyor 114 are configured to release foamed particulates 42 into a respective discharge chute that is configured to guide foamed particulates 42 down to bottom barrier 30 to prevent foamed particulates 42 from bouncing upon contact. First hopper 110 and second hopper 120 may each include one or more vibrating dampers 116, 126 configured to cause first and second hoppers 110, 120, respectively, to vibrate at one of more predetermined frequencies or with variable frequency to, in combination with the rotation speed of first and second distribution conveyors 112, 122, control the discharge rate of foamed particulates 42 through outlets 114, 124. First hopper 110 and second hopper 120 may also include internal baffles that are moveable or removable to selectively prevent or substantially limit foamed particulate 42 from discharging onto particular regions of first distribution conveyor 112 and second distribution conveyor 114, respectively. For example, when panel manufacturing system 50 is manufacturing insulation panels 10 having a width less than the full width of feeding conveyor 500, the internal baffles may direct the flow of foamed particulates 42 entirely or substantially to a portion of outlets 114, 124 that correspond to a desired width of insulation panels 10. In some embodiments, first hopper 110 and/or second hopper 120 may have an internal volume of approximately 130 cubic feet. First hopper 110 and/or second hopper 120 may be constructed of stainless steel or corrosion-resistant steel. The hoppers 110, 120 may have a trapezoidal or triangular shape to facilitate the downward flow of foamed particulates 42 and may utilize vibration (e.g., via vibrating dampers 116, 126) to assist in the gravity-fed downward flow of foamed particulates 42. Particle flow can be controlled by vibration frequency (e.g., air pressure), by the speed of the distribution conveyors 112, 122 conveyors, or by a combination thereof. First hopper 110 and second hopper 120 may be mechanically adjustable in height from 0" to 12".

Also supported by feeding section structure 410, roller assembly 200 includes one or more spare barrier rolls 210, a top barrier roller 220 for dispensing material for top barrier 20, and a bottom barrier roller 230 for dispensing material for bottom barrier 230. Spare barrier roll(s) 210 may be used to replace rolls of barrier material used on top barrier roller 220 or bottom barrier roller 230. Top barrier roller 220 and/or bottom barrier roller 230 may include an optical eye that is capable of detecting the diameter of a roll of material (e.g., paper-based material such as kraft paper) that is on the roller. Top barrier roller 220 may be positioned downstream of hopper assembly 100 and at the same height or higher than an upper inner surface of compression conveyor 600 to keep top barrier material taught and above foamed particulates 42 as it exits the feeding section. Bottom barrier roller 230 may be positioned upstream and below of the discharge point of first and second distribution conveyors 112, 122 of hopper assembly 100 so the bottom barrier material receives foamed particulates 42 from hopper assembly 100. Top and bottom barrier rollers 220, 230 may be configured to unroll the barrier materials at a controlled rotation rate in cooperation with the discharge rate of the foamed particulates 42 from hopper assembly 100. For example, top and bottom barrier rollers 220, 230 may be configured to rotate at one or more predetermined rotational rates or at a variable rotation rate. Top and bottom barrier rollers 220, 230 may be configured to handle rolls of barrier material cut to various widths, thereby minimizing the downstream cutting of barrier material and allowing for minimal material waste because the width of barrier material rolls used can be selected based on the desired width of insulation panels 10 being manufactured. Top and bottom barrier rollers 220, 230 may also include a mechanical fastener, such as a cap, clip, or snap, that holds rolls of barrier material in place during use and is selectively removable to allow empty rolls to be replaced.

Positioned between top and bottom barrier rollers 220, 230 and supported by feeding section structure 410, fluid discharge system 300 includes a bottom barrier fluid discharger 310 for discharging fluid onto bottom barrier material being unrolled by bottom barrier roller 230, a foamed particulate fluid discharger 320 for discharging fluid onto foamed particulate 42, and a top barrier fluid discharger 330 for discharging fluid onto top barrier material being unrolled by top barrier roller 220. Each fluid discharger 310, 320, 330 includes a fluid outlet 312, 322, 332 for selectively discharging fluid onto the materials, as shown in FIG. 4. In some embodiments, fluid dischargers 310, 320, 330 are configured to discharge fluid(s) that does not contain external non-water-soluble adhesives, such as water or water mixed with a carbohydrate such as starch (in liquid or vaporized form), though other fluids or mixing materials, such as organic compounds that do not impede repulpability or recyclability are contemplated. Fluid dischargers 310, 320, 330 may include a plurality of water nozzles (which may include, e.g., pulse-modulate nozzles), fluid nozzles, water atomizers, or rollers that disperse fluid droplets or vaporized fluid (e.g., by spraying via nozzles or atomizers or applying via rollers) across the length of feeding conveyor 500. One or more fluid dischargers 310, 320, 300 may have one or more spray valves, including an Everloy SK06 nozzle, an air atomized nozzle, a fine spray nozzle, a hollow cone nozzle, a flat fan nozzle, or a full cone nozzle. Fluid dischargers 310, 320, 330 may be configured to discharge fluid in a variety of spray patterns, for example, a conical pattern, a curtain pattern, or a thin, triangular spray such that the spray from adjacent nozzles abut one another with minimal overlap, as shown in FIG. 4. Fluid dischargers 310, 320, 330 may be configured to discharge fluid in an atomized or steam form. The fluid discharge rate at each nozzle or for each discharger can be controlled and set at one or more predetermined fixed discharge rates or set at a variable discharge rate by, for example, applying greater water pressure or air pressure within fluid dischargers 310, 320, 330, adjusting the water pressure and air pressure within fluid dischargers 310, 320, 330 while electronically (e.g., via frequency) using pulse-modulated nozzles, or by at least partially closing a nozzle (e.g., by rotatably screwing it in to limit the size of its fluid discharge opening). A typical air pressure used by the system is between 5-100 PSI and a typical water pressure is between 5-100 PSI. The rate of fluid discharged from a fluid discharger 310, 320, 330 can be selectively changed by adjusting the air pressure and/or water pressure on a water nozzle, fluid nozzle or water atomizer of a fluid discharger 310, 320, 330. Fluid dischargers 310, 320, 330 may also be configured to discharge heated fluid. Although not shown, fluid discharge system 300 and/or roller assembly 200 may include heating elements configured to apply heat (alone or in combination with fluid) towards desired portions of insulation panel 10 to aid in bonding between particulates 42 and other another and between particulates 42 and top and bottom barriers 20, 30.

Positioned below hopper assembly 100, roller assembly 200, and fluid discharge system 300 and supported by feeding section structure 410, feeding conveyor 500 may include a conveyor belt 510 rotatably supported by one or more conveyor rollers 520. Conveyor belt 510 may include a fluid-resistant material or coating to help prevent the fluid from fluid discharge system from damaging internal components of feeding conveyor 500. Conveyor rollers 520 may be conventional conveyor rollers or vibrating conveyor rollers that cause vibration of conveyor belt 510 to help evenly distribute foamed particulate 42 over the bottom barrier material. In some embodiments, the entire assembly of feeding conveyor 500 may be configured to vibrate.

Supporting various components of panel manufacturing system 50, support structure 400 may include multiple modular connected A-frame or U-frame structures made from, for example, corrosion-resistant steel. The modular connected structures are designed to be easily added or removed. As shown in FIGS. 3-7, feeding section structure 410, compression section structure 420, and discharge section structure 430 may each form rectangular skeletal structures aligned in series. In some embodiments, support structure 400 has one or more "open" sides to allow for easy and convenient access of materials and viewing of the manufacturing process. In other embodiments, support structure 400 has one or more "closed" sides, which may be selectively movable or removable, to contain materials within panel manufacturing system 50 and protect operators and nearby equipment and materials.

Collectively, the feeding section is configured to dispense the materials needed to construct insulation panel 10 in the proper arrangement and panel width along with the fluid that helps the materials to adhere together. As shown in FIG. 4, when in use, the top surface of feeding conveyor 500 moves in a forward direction pulling bottom barrier material downstream away from bottom barrier roller 230. Bottom barrier fluid discharger 310 discharges a fluid spray 314 onto the top surface of material forming bottom barrier 30 as bottom barrier 30 is pulled onto feeding conveyor 500. Foamed particulates 42 are then distributed onto the top surface of bottom barrier 30 by first distribution conveyor 112, creating a first layer of foamed particulate 42. A bottom portion of this first layer of foamed particulates 42 at least partially adheres to the top surface of bottom barrier 30 due to the fluid previously applied by bottom barrier fluid discharger 310.

Next, as shown more clearly in FIG. 5 since the view is obstructed in FIG. 4, foamed particulate fluid discharger 320 discharges a fluid spray 324 onto the top of the first layer of foamed particulates 42 before a second layer of foamed particulate 42 is distributed on top of the first layer of foamed particulates 42 by second distribution conveyor 122. In some embodiments, feeding conveyor 500 may optionally vibrate to cause loose foamed particulate 42 to shuffle around until it adheres to other foamed particulate 42 or to bottom barrier 30. A bottom portion of the second layer of foamed particulates 42 at least partially adheres to the first layer of foamed particulate due to the fluid applied by foamed particulate fluid discharger 320.

As the second layer of foamed particulates 42 approaches the compression conveyor 600, top barrier roller 220 positions the material forming top barrier 20 onto the top surface of the second layer of foamed particulates 42. The bottom surface of material forming top barrier 20 is sprayed with fluid spray 334 from top barrier fluid discharger 330 after it is drawn from top barrier roller 220 and before it is applied to the second layer of foamed particulates 42. A bottom surface of top barrier 20 at least partially adheres to the second layer of particulate 42 due to the fluid applied by top barrier fluid discharger 330. In this way, the feeding section creates a foamed particulate layer 40 that at least partially adheres to itself and to top barrier 20 and bottom barrier 30 before being fed into compression conveyor 600 for compression to the final height and to full adhere the materials. In conjunction with compression and/or heat, the fluid on the hydrated foamed particulates 42 may help facilitate the mechanical and/or chemical adhesion between foamed particulates 42 and between foamed particulate layer 40 and top and bottom barriers 20, 30.

Figure 6A:
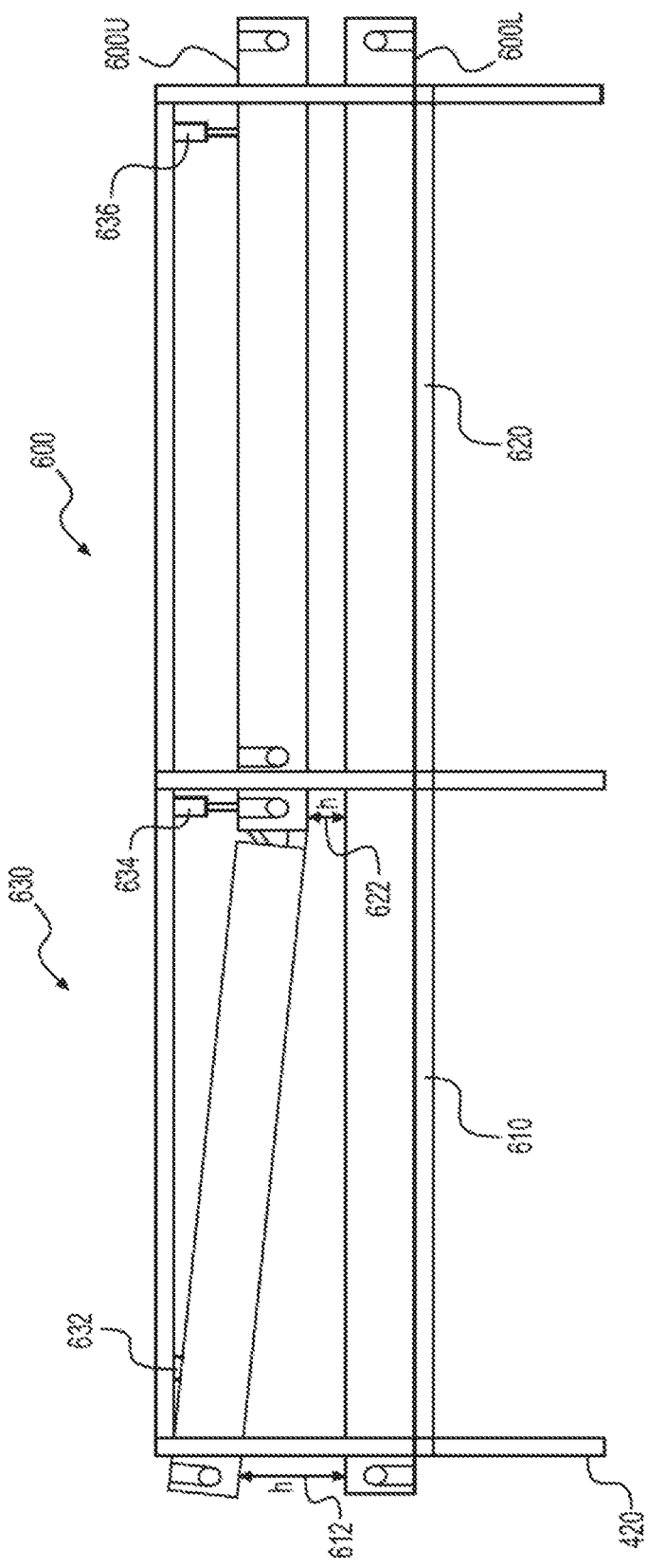
FIGS. 6A-B show a side view (FIG. 6A) and a perspective side view (FIG. 6B) of a compression subsystem of a panel manufacturing system, in accordance with an exemplary embodiment.
Figure 6B:
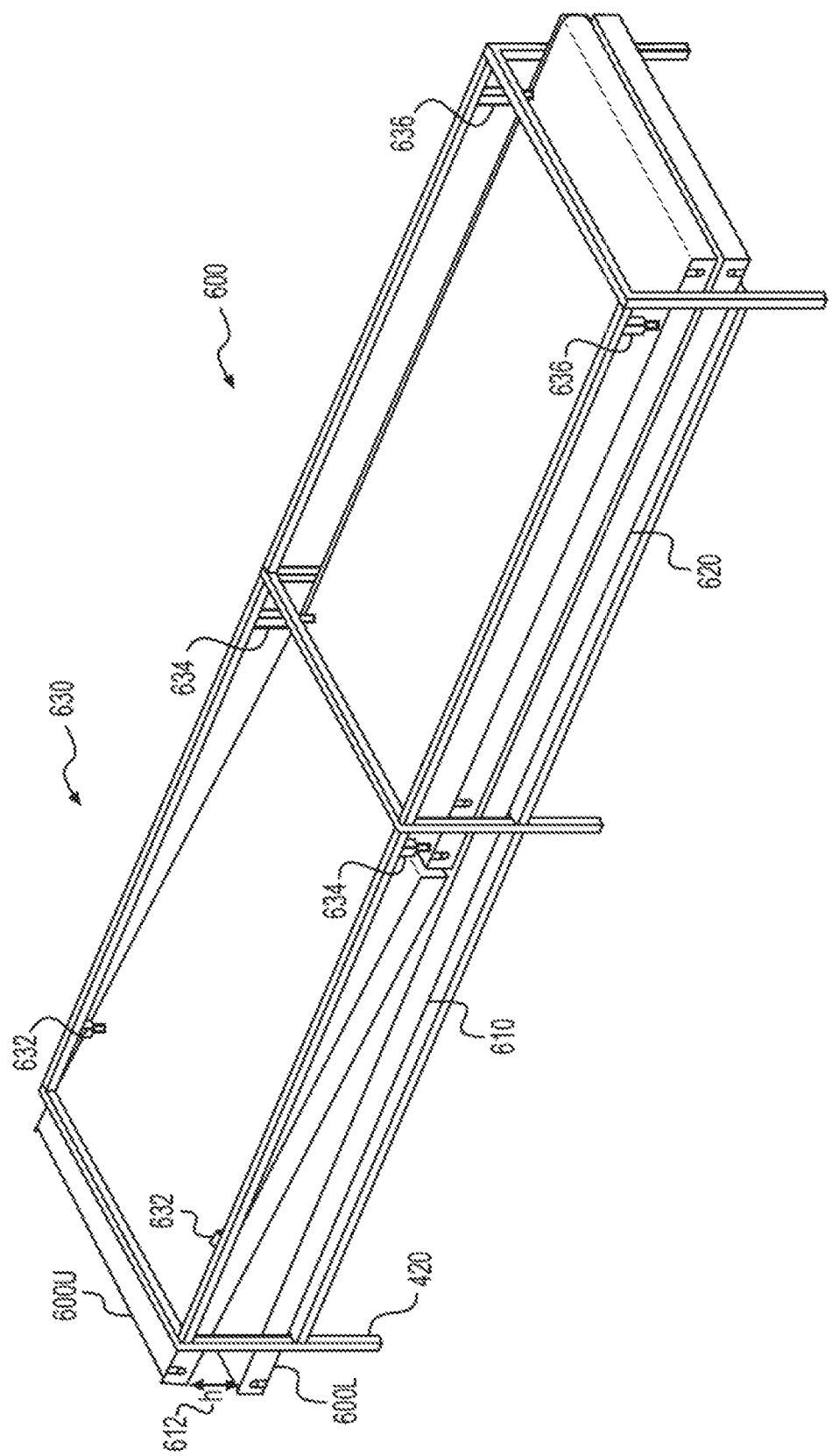

As shown in FIGS. 6A-B, the compression section is supported by compression section structure 420 and includes compression conveyor 600, which is divided into a first compression section 610 and a second compression section 620. Compression conveyor 600 may include upper and lower conveyors 600U, 600L, respectively, which may form single, continuous conveyors (e.g., a set of compression rollers in some embodiments, and rollers combined with a conveyor belt in other embodiments) that extend the entire length of compression conveyor 600 or multiple conveyors that extend the length of the first and second compression sections 610, 620. Either way, upper and lower conveyors 600U, 600L operate in unison to direct the material for the insulation panel 10 generated by feeding section (as described above) into a feed end of first compressor section 610 towards a discharge end of second compressor section 620. The feed end of first compressor section 610 has an inlet formed by the space between upper and lower conveyors 600U, 600L, and the inlet has an inlet height 612. Moving downstream away from the inlet, the height of the space between upper and lower conveyors 600U, 600L is gradually reduced from inlet height 612 to a compression height 622 at the end of first compressor section 610, and the compression height 622 is maintained through the end of second compression section 620. In some embodiments, compression conveyor 600 has an inlet height 612 up to about 12" and a compression height between about 0.125" and 12". The height of upper and lower conveyors 600U, 600L may be selectively adjustable such that the inlet height 612 and compression height 622 are adjustable based on the desired final height of insulation panel 10. In some embodiments, the inlet height 612 and compression height 622 may be the same.

In operation, as shown in FIG. 4, top barrier 20, foamed particulates 42, and bottom barrier 30 may have an uncompressed height that is less than or equal to the inlet height 612 and gradually compress as the material moves downstream within first compression section 610 until ultimately compressing to compression height 622. Then, compression is maintained throughout the length of second compression section 620 to facilitate full adherence between foamed particulates 42 to form foamed particulate layer 40 and between foamed particulate layer 40 and top and bottom barriers 20, 30. This extended compression also fixes the height of insulation panel 10, minimizing the extent that foamed particulate layer 40 expands after exiting compression conveyor 600 and keeping the height of insulation panel 40 uniform in advance of being cut or creased. To ensure sufficient adhesion between foamed particulates 42 and to prevent re-expansion of the insulation materials after exiting compression conveyor 600, a minimum compressive force is required to adequately crush foamed particulate layer 40. The compression force required to compress 1.0" of wet foamed particulates 42 is about 20 to 200 pounds per square foot in some embodiments, and about 50 to 150 pounds per square foot in other embodiments. The application of a minimum compressive force to foamed particulate layer 40 paired with the bonding provided by the fluid applied to the foamed particulates 42 facilitates adhesion between each of foamed particulates 42 and between foamed particulate layer 40, top barrier 20, and bottom barrier 30. In other embodiments, it is contemplated that second compression section 620 may be angled as well.

To adjust inlet height 612 and the compression height 622 of compression conveyor 600, compression conveyor 600 includes a front actuator 632, a middle actuator 634, and a rear actuator 636. For example, front actuator 632 vertically adjusts the inlet end of upper conveyor 600U to adjust inlet height 612, middle actuator 634 vertically adjusts the middle portion of upper conveyor 600U to adjust compression height 622, and rear actuator vertically adjust the outlet end of upper conveyor 600U. In other embodiments, the height of various portions of upper conveyor 600U and/or lower conveyor 600L may be manually adjustable by an operator or by a mechanical or electrical adjustment system, as will be appreciated by one of skill in the art. Accordingly, compression conveyor 600 is capable of outputting insulation panel materials of having different thicknesses, enabling panel manufacturing system 50 to manufacture insulation panels 10 of various uniform heights.

Optionally, compression conveyor 600 may include or be in communication with one or more heat sources (not shown), and configured to transfer heat to insulation panel materials to further facilitate adherence of the insulation panel materials during compression. A person of skill in the art would appreciate that heated compression is more effective and lasting (e.g., helps prevent expansion following compression) for certain materials by accelerating the binding of foamed particulates 42 to each other and top and bottom barriers 20, 30.

Figure 7A:
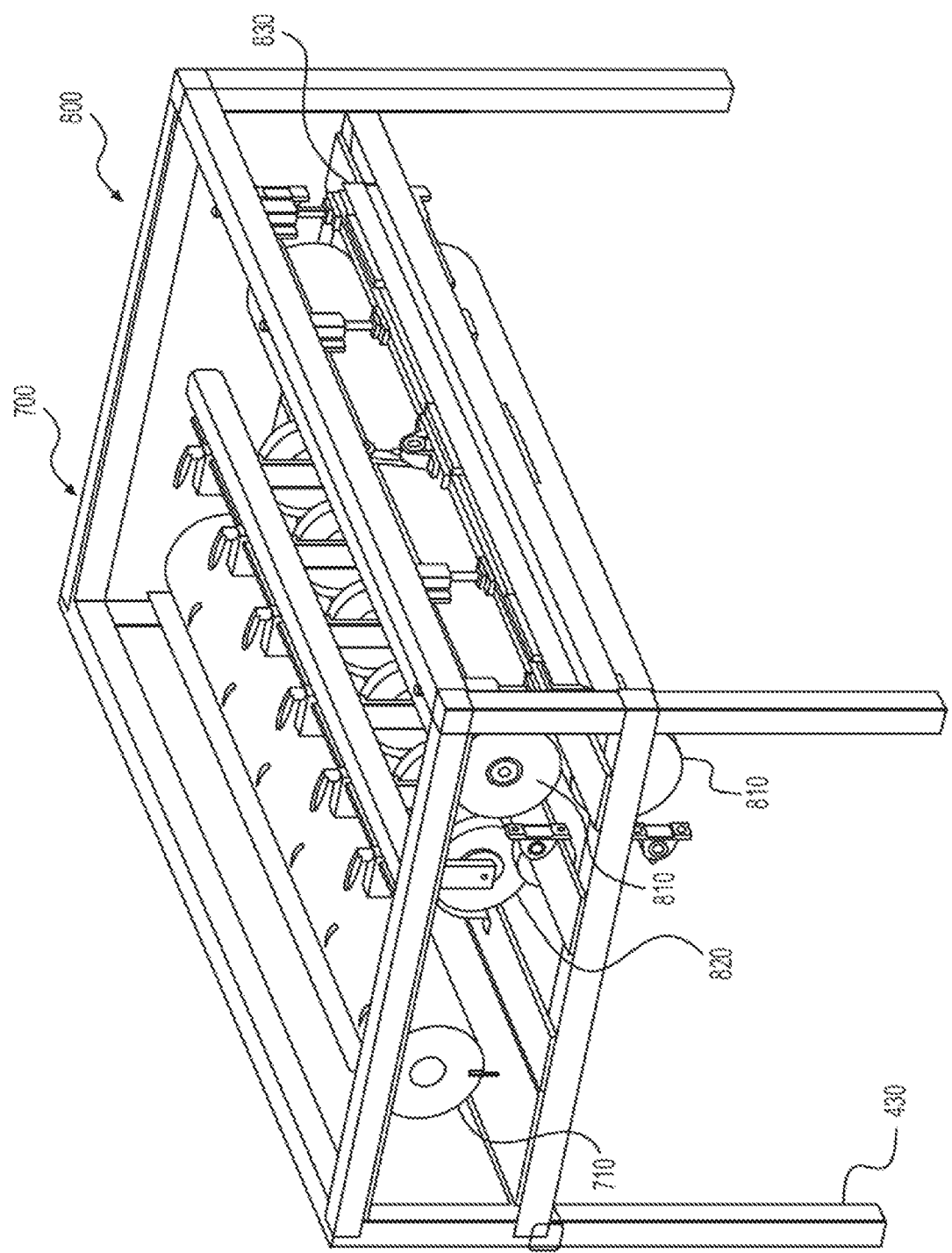
Figure 7B:
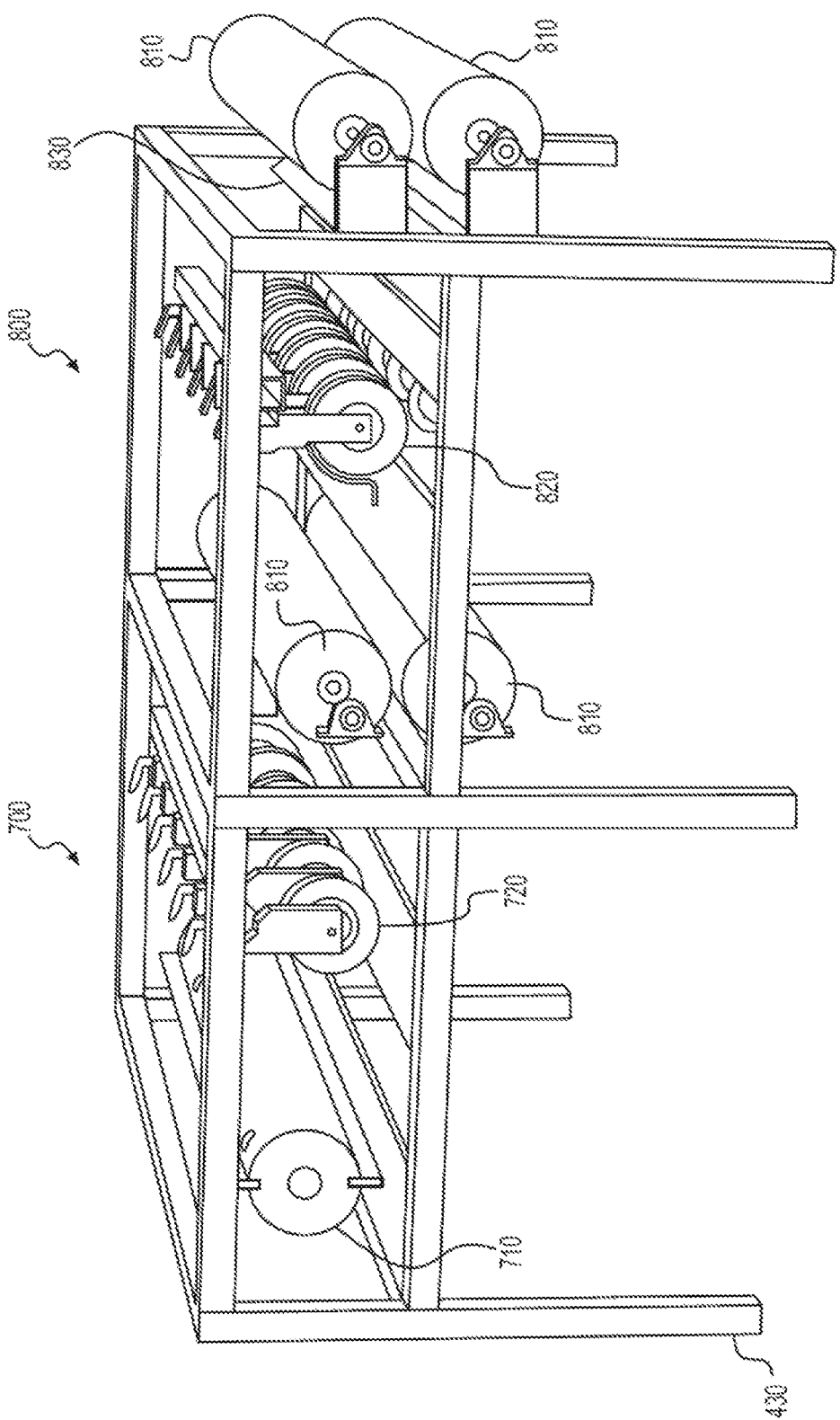
FIG. 7B shows a perspective side view of creasing and cutting subsystems of a panel manufacturing system, in accordance with another exemplary embodiment.

As shown in FIGS. 7A-B, creasing and cutting section is supported by discharge section structure 430 and includes creasing system 700 for creasing the edges of top barrier 20 and bottom barrier 30 around foamed particulate layer 40 and cutting system 800 for cutting the insulation materials into unitary insulation panels 10 of a desired length (and, as needed, width). FIG. 7A shows one exemplary embodiment of creasing and cutting section, in which creasing system 700 includes a creasing roller assembly 710 and cutting system 800 includes a cutting rolling assembly 810, a longitudinal cutting blade assembly 820, and a lateral cutting blade assembly 830. Creasing roller assembly 710 creases perpendicular to feed direction, and operates at pre-timed intervals. When creasing roller assembly 710 rotates downwardly towards incoming panel materials, it hits the panel. When creasing roller assembly 710 rotates upwardly towards incoming panel materials, the panel materials pass below creasing roller assembly 710 untouched. Optionally, in some embodiments as shown in FIG. 7B, creasing system 700 includes a creasing blade assembly 720, which has one or more blades configured to partially deform one or more edges of insulation panel 10 that parallel the feed direction to crease the side edges of top barrier 20 and bottom barrier 30 around foamed particulate layer 40 in addition to or in lieu of creasing roller assembly 710. According to some embodiments, creasing blade assembly 720 can be used instead of creasing roller assembly 710 when the incoming panel materials enter creasing system 700 perpendicularly to the machine direction in order to perform the creasing "in-line" rather than perpendicular to the machine direction. In some embodiments, creasing system 700 may utilize two dull-blades that allow insulation panel 10 to fold at a 90 degree angle without tearing or damaging top or bottom barriers 20, 30. Creasing system 700 is servo driven, enabling accurate positioning of the insulation materials for creasing. After exiting creasing system 700, each insulation panel 10 may have two (or more) creases, as shown in FIGS. 1B-D.

After insulation panel 10 has been creased, nip roller assembly 810 stabilizes insulation panel 10 for cutting blade assemblies 820, 830. Nip roller assembly 810 may include upper and lower rollers or sets of rollers, as shown, and may be positioned between longitudinal cutting blade assembly 820 and lateral cutting blade assembly 830 (FIG. 7A) or upstream and downstream of lateral cutting blade assembly 820 (FIG. 7B). Longitudinal cutting blade assembly 820 includes one or more blades configured to cut insulation materials into unitary insulation panels of a desired width. Lateral cutting blade assembly 830 includes one or more blades (e.g., a guillotine style blade extending at least the full length of each insulation panel 10) configured to cut insulation materials into unitary insulation panels of a desired length. In some embodiments, lateral cutting blade 830 may be configured to provide a stationary, intermittent, cutting mechanism. In other embodiments, lateral cutting blade 830 may be configured to provide a continuous cutting mechanism to allow for continuous production of insulated panels. The continuous cutting mechanism is indexed to match web movement and performs its cutting action while traveling along the web at synchronous speed (e.g., a flying knife, flying ultrasonic cutter and sealer, rotary knife, etc.). It is contemplated that cutting system 800 may include either or both cutting assemblies 820, 830, and some cutting or trimming of insulation panels 10 may be handled by equipment outside of panel manufacturing system 50 (e.g., handled by on-site equipment if exact dimensions for insulation panel 10 are not known in advance).

In some embodiments, as shown in FIGS. 8A-8E, a panel manufacturing system 50 includes a bulk particulate feeding system 902 as an exemplary type of particulate feeder 900 and a reclamation system 1002 as an exemplary type of reclamation system 1000. Bulk particulate feeding system 902 has one or more bulk feeding hoppers 910A, 910B, 910C, and 910D containing foamed particulates 42 that are fed into first hopper 110 and second hopper 120 via a bulk feeding conveyor 920 and a delivery conveyor system 930. Specifically, bulk feeding hoppers 910A, 910B, 910C, 910D dispense foamed particulates 42 onto a conveyor belt 922, which elevates the foamed particulates 42 so that they may be dispensed onto delivery conveyor 930. Conveyor belt 922 has a plurality of ridges 924 that prevent foamed particulate 42 from rolling backwards as conveyor belt 922 inclines and declines, which eliminates the additional space required to suspend bulk feedings hoppers 910A, 910B, 910C, 910D above delivery conveyor system 930 and panel manufacturing system 50.

Figure 8A:
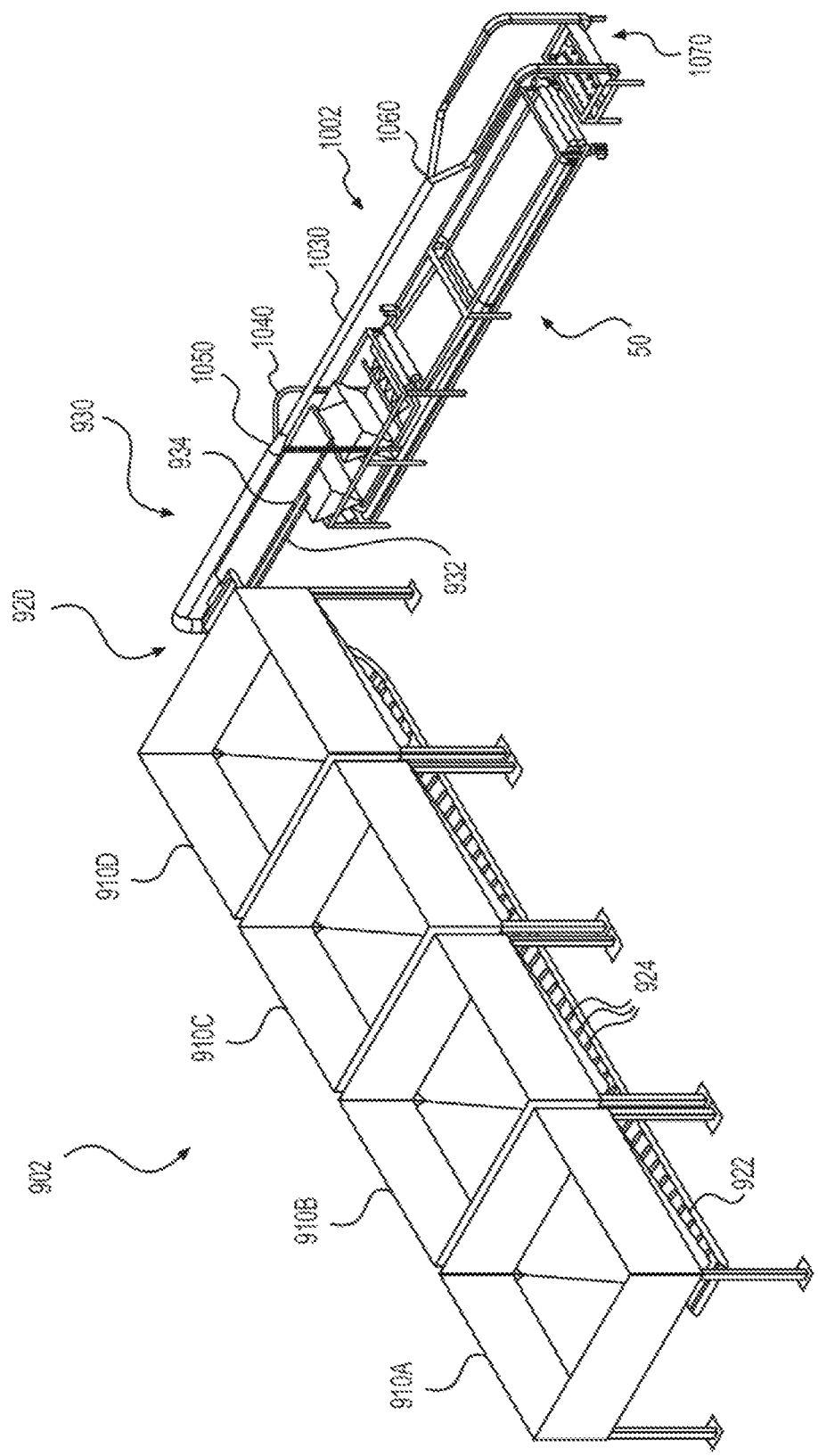
FIGS. 8A-E show a panel manufacturing system having a bulk particulate feeding system, according to an exemplary embodiment. Specifically.
Figure 8B:
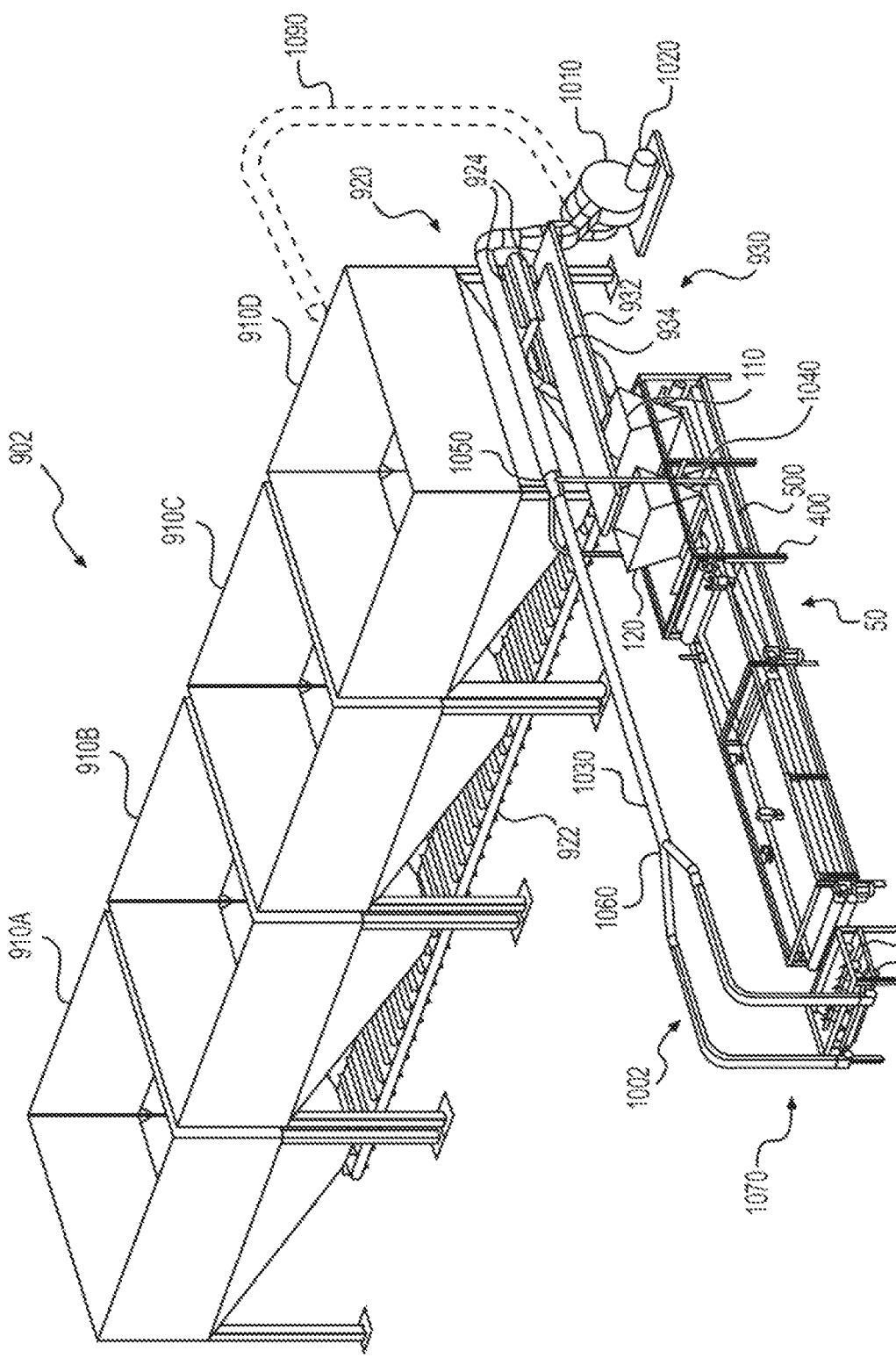
Figure 8C:
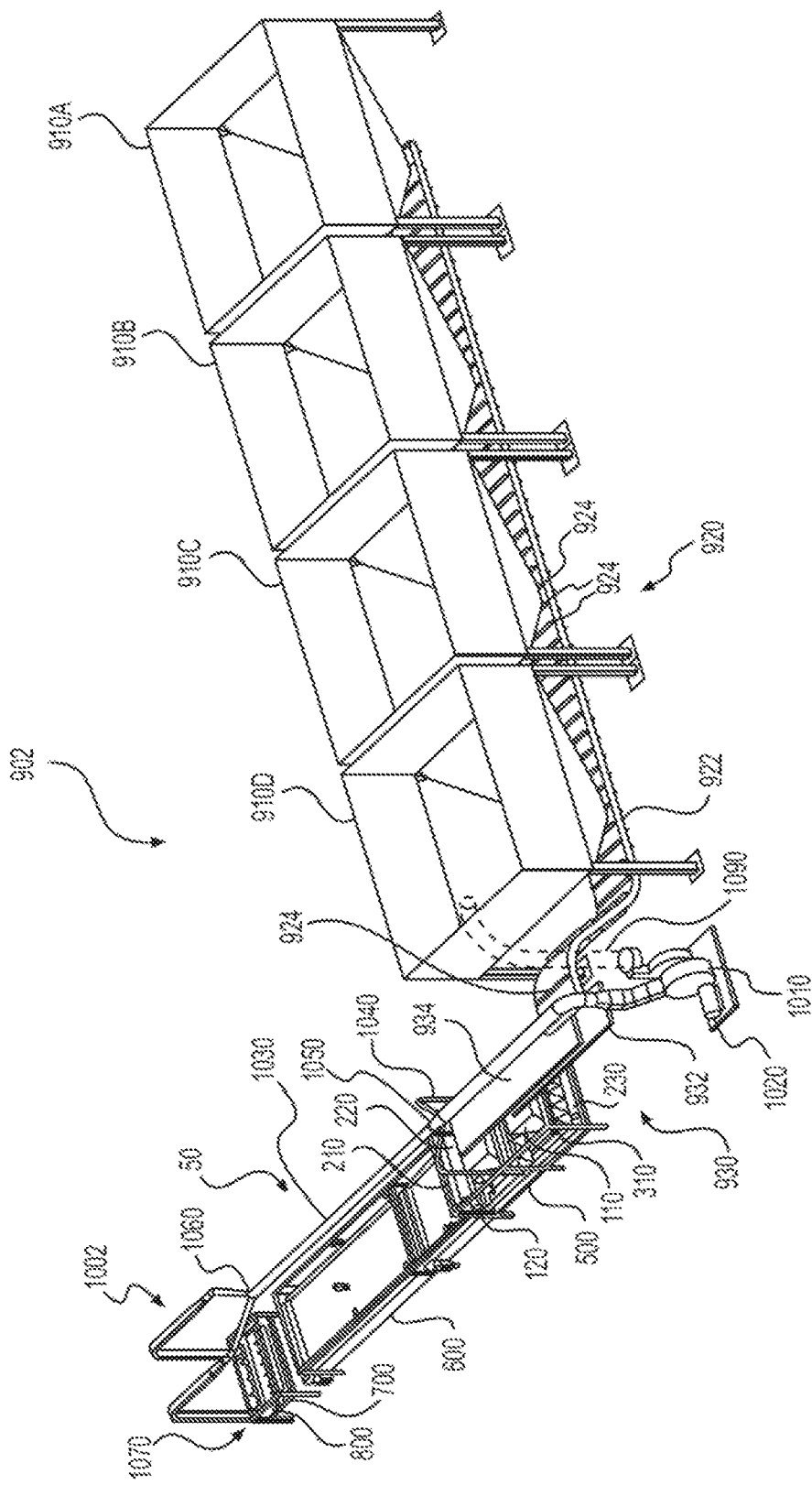

When foamed particulates 42 reach the end of conveyor belt 922, a first portion of foamed particulates 42 is dropped onto a first delivery conveyor 932 of delivery conveyor system 930 that delivers the first portion of foamed particulates 42 to first hopper 110, and a second portion of foamed particulates 42 is dropped onto a second delivery conveyor 934 of delivery conveyor system 930 that delivers the second portion of foamed particulates 42 to second hopper 120, as shown in FIGS. 8A-8E. Bulk feeding hoppers 910A, 910B, 910C, 910D can have controllably moveable internal baffles that enable foamed particulates 42 to be selectively dispensed onto different regions of the surface of conveyor belt 922 (e.g., direct all foamed particulates onto a left half of conveyor belt 922 if only delivery conveyor 932 and first hopper 110 are in operation for a particular job in the same manner described above with respect to the baffles of hoppers 110 and 120). Accordingly, as shown in FIG. 8C, conveyor belt 922 may unevenly distribute foamed particulate 42 to first delivery conveyor 932 and second delivery conveyer 934 by virtue of an uneven distribution of foamed particulate 42 on the surface of conveyor belt 922 caused by the use of the baffles.

Reclamation system 1002 reclaims scrap materials from the feeding section and/or the creasing and cutting section that would otherwise be discarded and sends the scrap materials to particulate feeding system 902. Reclamation system 1002 may include a hammermill 1010 for crushing the scrap materials, a main vacuum 1020 for suctioning the scrap materials into hammermill 1010, a plurality of reclamation pipes including a main pipe 1030 having an upstream joint 1050 with upstream pipes 1040 extending downwards towards the feeding section and a downstream joint 1060 with downstream pipes 1070, and a discharge pipe 1090. Hammermill 1010 may internally include one or more mesh screens having a plurality of openings sized to filter particulates of different sizes and shapes, thereby preventing oversized particulates from passing through hammermill 1010 and directed back into panel manufacturing system 50 (e.g., via one or more hoppers). The particulates will be grinded or shredded down until they reach the threshold maximum size and shape necessary to pass through an opening in at least one of the mesh screens, at which point the particulate may pass through the hammermill. Discharge pipe 1090 may be configured to direct (e.g., via main vacuum 1020 or one or more blowers or vibrating dampers disposed within or in fluid communication with discharge pipe 1090) crushed scrap materials from hammermill 1010 back into one or more of hoppers 110, 120, 910A, 910B, 910C, and 910D.

The reclamation pipes may be sized and shaped to transport scrap material of a variety of sizes and shapes. It is contemplated that the reclamation pipes may be flexible to accommodate scrap materials of various sizes and shapes. Main pipe 1030 may be between 3 inches and 24 inches in diameter, and is in fluid communication with upstream pipes 1040 through upstream joint 1050 and with downstream pipes 1070 through downstream joint 1060. Upstream pipes 1040 may be between about 3 inches to 24 inches in diameter, and downstream pipes may also be between about 3 inches to 24 inches in diameter. Upstream and downstream joints 1050, 1060 may be between about 3 to 24 inches in diameter.

Figure 8D:
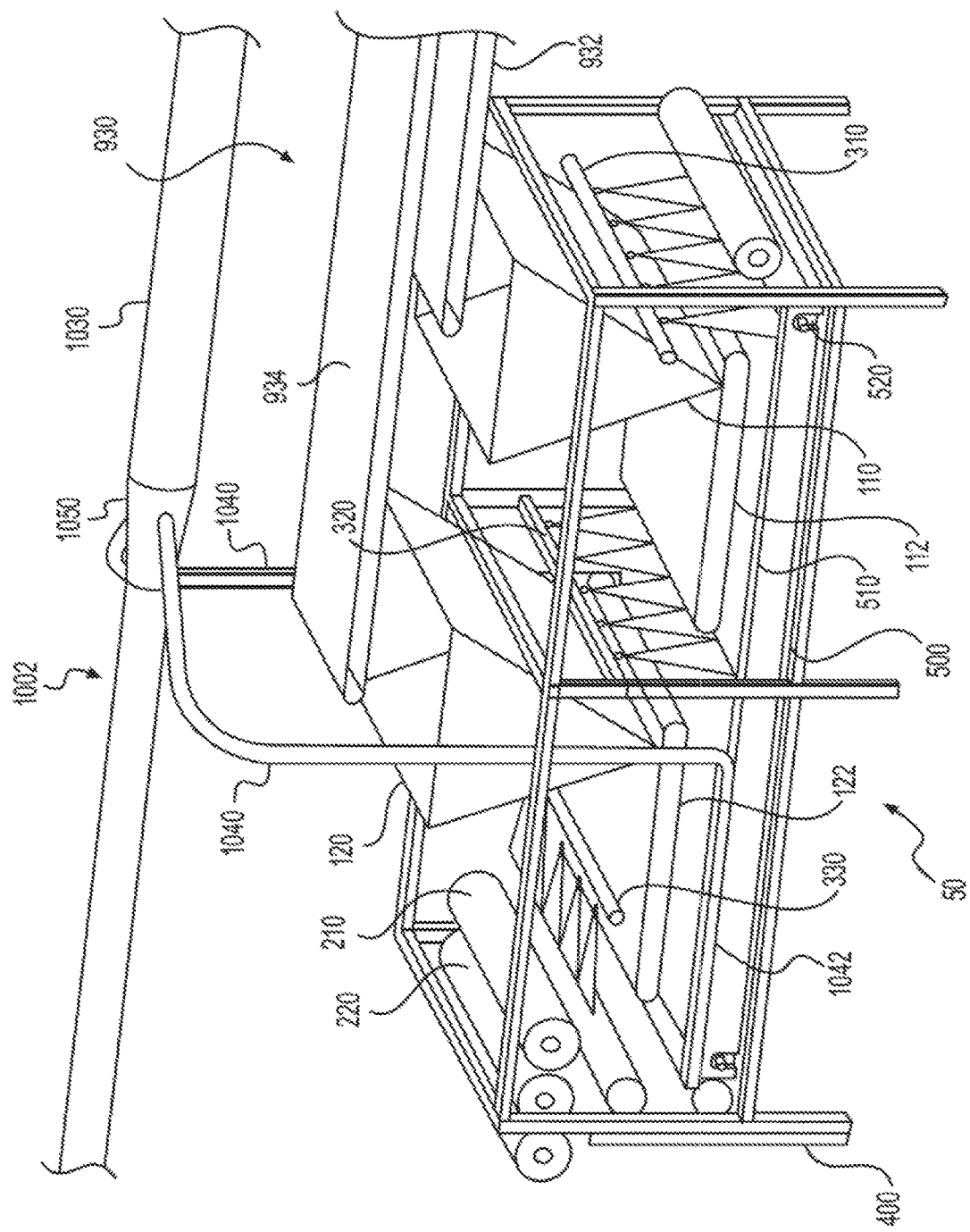

Shown more clearly in FIG. 8D, upstream pipes 1040 may be positioned proximate second hopper 120 and feeding conveyor 500, and each pipe 1040 includes a vacuum strip 1042 for suctioning scrap material proximate the edges of feeding conveyor 500. Optionally, upstream pipes 1040 may alternatively or additionally extend downwardly proximate first hopper 110, or extend the entire length of feeding conveyor 500. The number and size of upstream pipes 1040 may vary based on the size and strength of vacuum stripes 1042 and anticipated volume of scrap material.

Figure 8E:
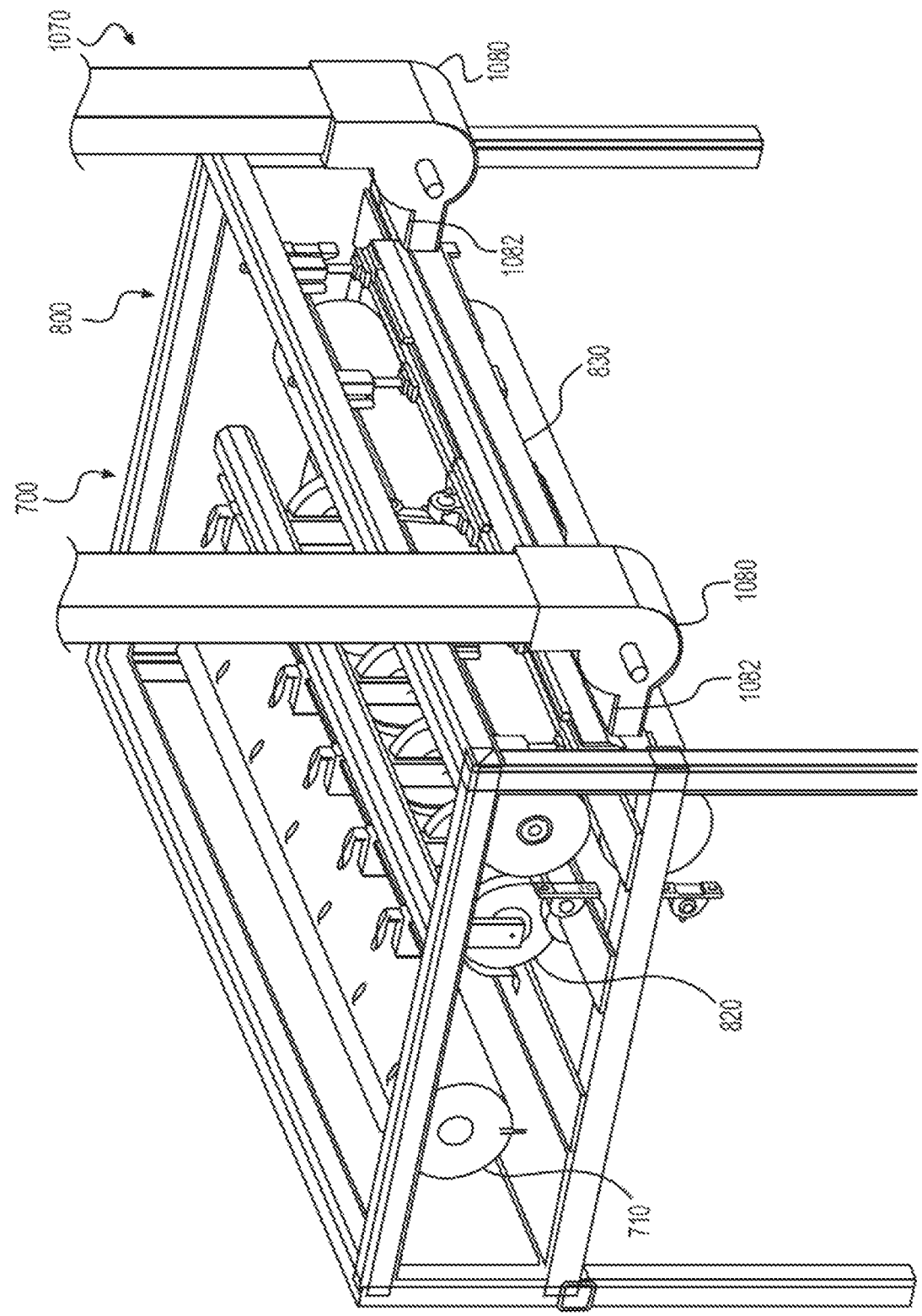

Shown more clearly in FIG. 8E, downstream pipes 1070 may be positioned immediately downstream of cutter system 800, and each pipe 1070 may include a grinder 1080 for grinding freshly cut scrap material proximate cutting system 800 to resize and reshape all scrap materials entering downstream pipes 1070 via inlet chutes 1082 to fit within reclamation system 1002. Grinder 1080 may include one or more trim "choppers" that are vacuum assisted. The waste trim enters the choppers and is grinded into a coarse particle size and transported to hammermill 1010 using a vacuum.

Figure 9:
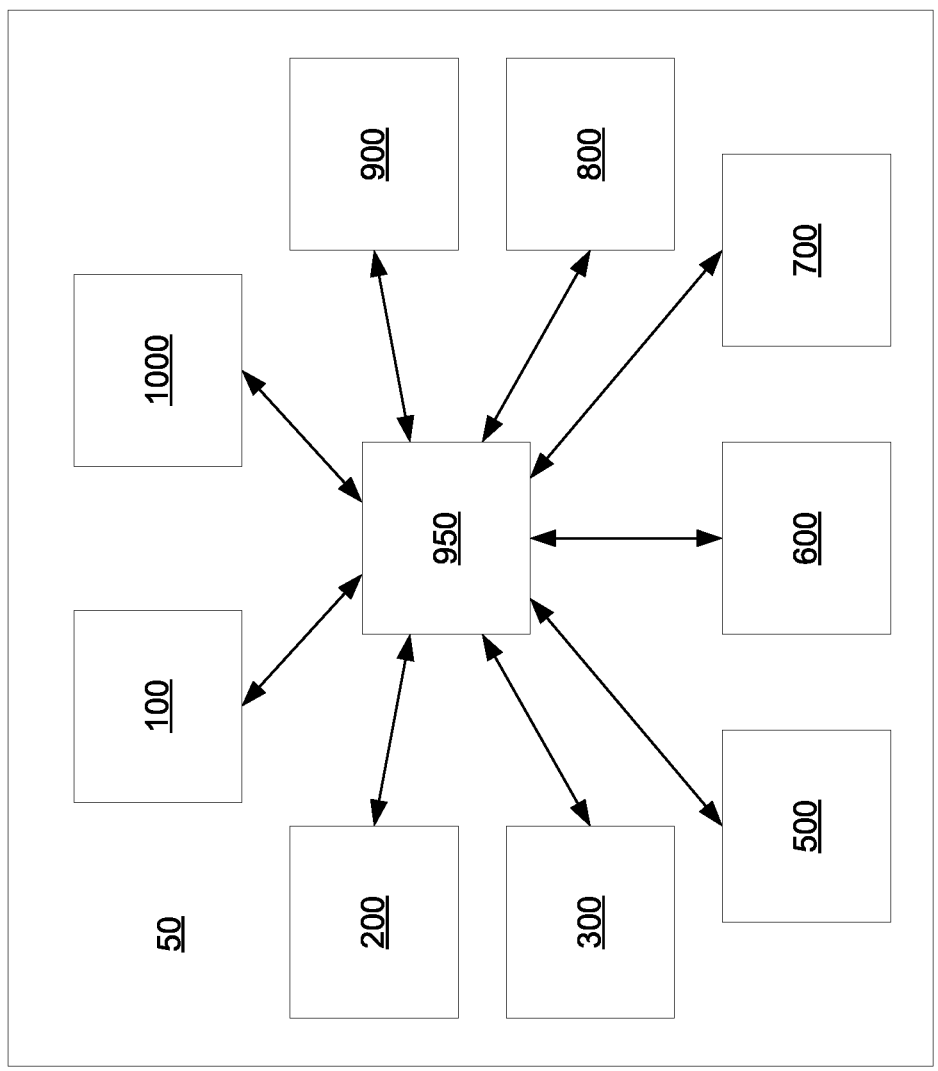
FIG. 9 shows a panel manufacturing system having a controller, in accordance with an exemplary embodiment.

FIG. 9 shows an exemplary embodiment of panel manufacturing system 50 having a controller 950. Controller 950 can be a variety of electronic devices programmable to control the various functions of the panel manufacturing system 50, such as the hopper assembly 100, roller assembly 200, fluid discharge system 300, feeding conveyor 500, compression conveyor 600, creasing system 700, cutting system 800, particulate feeder 900, and reclamation system 1000. Controller 950 can be a microcontroller that is, for example, programmable or pre-programmed (e.g., application specific integrated circuits (ASICs)). Alternatively, controller 950 can be a PC, server, mainframe, or other computer programmed device that controls aspects of panel manufacturing system 50. Controller 950 can include an application (or, "app") on a smartphone or tablet. Controller 950 can be connected to the system using, for example, a direct wired connection, an Ethernet connection (e.g., Ethernet PLC communication for plant data interface), a local area network (LAN), a wireless local area network (WLAN), an internet connection, a wireless connection, Bluetooth, near-field communication (NFC), or a cellular or radio connection. Controller 950 can also be networked via a similar connection to enable remote operation and control.

Controller 950 can control various aspects of panel manufacturing system 50 to achieve an efficient and orderly production of insulation panels 50 by adjusting various aspects so that the process flow is balanced and avoids bottlenecks and other such issues. For example, with respect to hopper assembly 100 and similarly with respect to bulk particulate feeding system 902, controller 950 can control the frequency of hopper vibration and the rotation speed of first and second distribution conveyors 112, 122 in order to affect the discharge rate of foamed particulate 42 out of outlets 114, 124 of hoppers 110, 120 (and similarly for hoppers 910a, 910b, 910c, 910d and conveyors 920, 930 in bulk feeding system 902). In some embodiments, controller 950 may be in communication with one or more sensors (not shown) disposed between hoppers 110, 120 that are configured to detect the height of foamed particulate 42. When controller 950 determines that the detected height of foamed particulate 42 exceeds a predetermined threshold (e.g., above or below a target height), controller 950 may direct the rotation speed of the first and second distribution conveyors to increase or decrease to adjust the height of the foamed particulate 42 within the threshold range of the target height. Controller 950 may also control the internal baffles of hoppers 110, 120, 910A, 910B, 910C, 910D to control the distribution of foamed particulate 42 that is dispensed on the surface below (e.g., onto a portion of a conveyor). Thus, controller 950 can control the rate and distribution at which the hoppers 110, 120, 910a, 910b, 910c, 910d dispense foamed particulate onto distribution conveyors 112, 114 and/or bulk feeding conveyor 920. Further, controller 950 can independently control the speed of each conveyor 500, 600, 112, 114, 922, 932, 934 of panel manufacturing system 50, thereby enabling control of the amount and the speed of foamed particulate 42 at various points in panel manufacturing system 50. Thus, for example, if there are too many foamed particulates 42 in first hopper 110 such that it is at risk of overflowing, controller 950 may take one or more actions to avoid an overflow, such as reducing the speed of first delivery conveyor 932 and/or conveyor belt 922, reducing the speed that bulk particulate feeding system dispenses foamed particulate 42 onto conveyor belt 922, adjusting one or more baffles of bulk feeding hoppers 910A, 910B, 910C, 910D to reduce the quantity of foamed particulate directed at first delivery conveyor 932, or increasing the speed first hopper 110 dispenses foamed particulate onto feeding conveyor 500 (as described above). In addition to controlling the speed of feeding conveyor 500, in some embodiments, controller 950 is also configured to activate and control the vibration of feeding conveyor 500.

With respect to roller assembly 200, controller 950 is configured to control the speed of top barrier roller 220 and bottom barrier roller 230 to align with the speed of feeding conveyor 500 and compressor conveyer 600 such that top barrier 20 and bottom barrier 30 are uniformly dispensed on the conveyors 500, 600. Further, controller 950 may receive a signal from one or more optical eyes positioned about top barrier roller 220 and/or bottom barrier roller 230 that indicates the diameter of the roll that remains on a roller. When a roll (e.g., of kraft paper) reaches a predetermined minimum diameter, controller 950 may send a signal to cause one or more aspects of panel manufacturing system 50 (e.g., fluid discharge system 300, feeding conveyor 500, compressor conveyor 600) to temporarily cease operation to prevent waste while the roll is replaced.

With respect to fluid discharge system 300, controller 950 is configured to selectively control the air pressure and/or water pressure of one or more fluid dischargers 310, 320, 330 to control the rate at which fluid is dispensed. Controller 950 may also be configured to selectively close or partially close one or more nozzles of fluid dischargers 310, 320, 330 to affect the fluid discharge area, flow rate, or spray shape. For example, controller 950 may selectively close the rightmost two nozzles of fluid dischargers 310, 320, 330 to prevent fluid from discharging directly onto feeding conveyor 500 if the top and bottom barrier materials have a smaller width and foamed particulates 42 are being restricted from flowing onto the right side of feeding conveyor 500.

With respect to compression conveyor 600, controller 950 is configured to control the height adjustments of upper conveyor 600U relative to lower conveyor 600L as well as the timing sequence of conveyors 600U and 600L to uniformly pull top barrier 20 and bottom barrier 30 within compression conveyor 600. Additionally, controller 950 may be configured to control operation of heat sources in fluid communication with compression conveyor, thereby controller temperature and exposure duration for heating during the compression phase of manufacturing.

With respect to creasing system 700 and cutting system 800, controller 950 is configured to control the timing sequence of creasing cutter assembly 720 and cutting cutter assembly to yield cut and creased insulation panels 50 of a predetermined size and geometry. Controller 950 can also be in communication with one or more sensors (not shown) disposed in panel manufacturing system 50 and adjust settings of various systems to provide quality control. For example, when controller 950 has specified a predetermined height, length, and width for insulation panel 10, sensors may measure the various dimensions of insulation panel 10 following cutting or following each respective stage in the manufacturing process. Controller 950 may determine that, based on measurement data from the sensors, settings adjustments are required for one or more systems within panel manufacturing system 50 (e.g., measured height does not equal predetermined height due to expansion of materials after exiting compression conveyor 600), and communicate the adjustments to those systems (e.g., adjust heights of compression conveyor 600 to account for expansion so insulation panel 10 has predetermined height). Controller 950 may control the application of external heat and/or vibrations (e.g., for ultrasonic creasing) during creasing.

With respect to reclamation system 1000, controller 950 is configured to control which pipes (upstream and downstream) are active, the speed of vacuum(s), and the settings of material crushing and grinding devices to ensure that reclamation system 1000 functions as desired. Controller 950 may also estimate levels of foamed particulate 42 needed to complete a particulate job, track how much scrap material has been collected by reclamation system 1000, and limit or shut off operation of particulate feeder 900 when controller 950 determines that collected scrap material is sufficient to complete the job without or with minimal additional foamed particulate 42 from particulate feeder 900.

Figure 10:
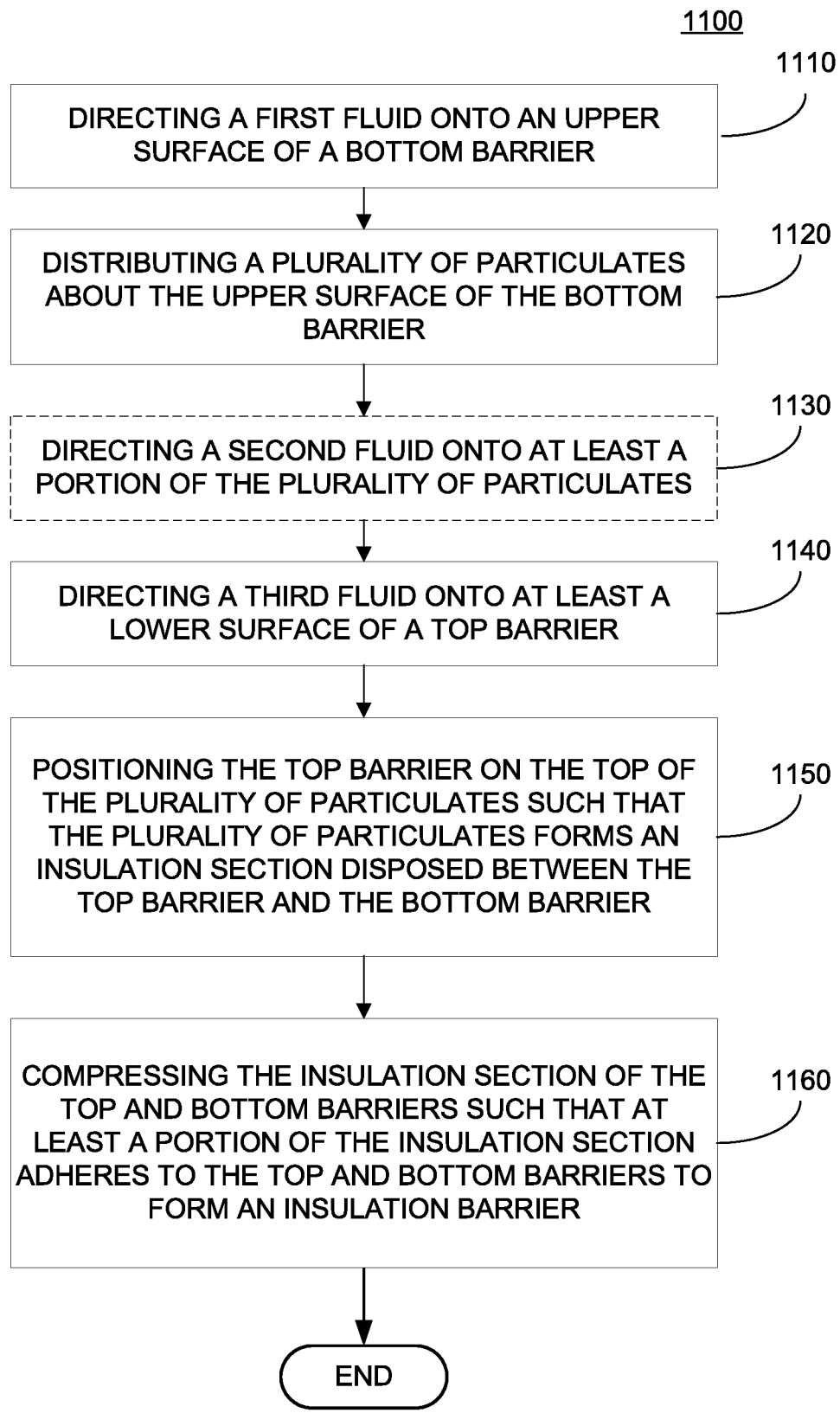
FIG. 10 is a flowchart of a method for fabricating an insulation panel, in accordance with an exemplary embodiment.

FIG. 10 is a flowchart of a method 1100 for fabricating an insulation panel 10, in accordance with an exemplary embodiment. At block 1110, the method includes directing a first fluid that does not contain external non-water-soluble adhesives (e.g., water or water mixed with a carbohydrate such as starch, in either liquid or vaporized form) onto an upper surface of a bottom barrier 30. For example, bottom barrier fluid discharger 310 may direct a first fluid onto bottom barrier 30 that is dispensed onto feeding conveyor 500 from bottom barrier roller 230.

At block 1120, method 1100 includes distributing a plurality of particulates about the upper surface of the bottom barrier 30. The particulates may be puffed carbohydrate (e.g., polysaccharides such as starch, including vegetable starch, or cellulose) particles, or a combination thereof. For example, particulates originating from discharge assembly (e.g., first hopper 110 and/or second hopper 120) may be dropped onto the upper surface of bottom barrier 30 by first distribution conveyor 112 and/or second distribution conveyor 114. In some embodiments, distributing the plurality of particulates (e.g., foamed particulates 42) about the upper surface of the bottom barrier 30 may include providing a first layer comprising primary particulates onto the upper surface of the bottom barrier 30 and providing a second layer comprising secondary particulates onto the first layer. In some embodiments, the secondary particulates differ from the primary particulates (e.g., in size, shape, and/or composition). It is also contemplated that the primary and secondary particulates may come from different sources (e.g., from an extruder and from shredded scrap material recovered by reclamation system 1000). In other embodiments, distributing the plurality of particulates (e.g., foamed particulates 42) about the upper surface of the bottom barrier may including vibrating at least a portion of the bottom barrier to distribute the plurality of particulates into a substantially uniform particulate layer along the portion of the bottom barrier.

At block 1130, method 1100 involves directing a second fluid that does not contain external non-water-soluble adhesives (e.g., water or water mixed with a carbohydrate such as starch, in either liquid or vaporized form) onto at least a portion of the plurality of particulates. For example, foamed particulate fluid discharger 320 may direct a second fluid onto a portion of the plurality of particulates that are positioned on top of bottom barrier 30 as it proceeds down feeding conveyor 500. In some embodiments, directing a second fluid comprises applying the second fluid between a first layer of particulates and a second layer of particulates. According to some embodiments where a thinner insulation panel 10 and/or a thinner foamed particulate layer 40 is desired, method 1100 may omit step 1130.

At block 1140, method 1100 involves directing a third fluid that does not contain external non-water-soluble adhesives (e.g., water or water mixed with a carbohydrate such as starch, in either liquid or vaporized form) onto at least a lower surface of a top barrier 20. For example, top barrier fluid discharger 330 may direct a third fluid onto a lower surface of top barrier 20 as top barrier is pulled from top barrier roller 220. According to some embodiments, the first, second, and third fluids are vaporized water.

At block 1150, method 1100 involves positioning the top barrier 20 on top of the plurality of particulates such that the plurality of particulates forms an insulation section (e.g., foamed particulate layer 40) disposed between the top barrier 20 and the bottom barrier 30. For example, top barrier 20 may pulled off of top barrier roller 220 and placed on top of the plurality of particulates as the plurality of particulates advances down feeding conveyor 500. Top and bottom barriers 20, 30 may be paper-based barriers.

At block 1160, method 1100 involves compressing the insulation section and the top and bottom barriers 20, 30 such that at least a portion of the insulation section at least partially adheres to the top and bottom barriers 20, 30 to form an insulation panel 10. For example, compression conveyor 600 may compress the insulation section, as shown in FIG. 4. In some embodiments, compressing the insulation section and the top and bottom barriers 20, 30 includes compressing the insulation section and the top and bottom barriers 20, 30 to a first height in a first section of a compression conveyor 600, and compressing the insulation section and the top and bottom barriers 20, 30 to a second height in a second section of the compression conveyor 600, where the first height differs from the second height, and the first and second height are adjustable. At least a portion of the discrete particulates 42 of the insulation may at least partially adhere (e.g., via mechanical, chemical, dispersive, and/or diffusive adhesion) to one another and to the top and bottom barriers 20, 30 by, for example, covalent bonds, ionic bonds, hydrogen bonds, or any combination thereof as described herein. For example, the particulates of the insulation core layer may at least partially adhere to one another and/or to the top and/or bottom barriers via direct chemical adhesion or adhesive layer. The direct chemical adhesion can be via a covalent bond, including, but not limited to, a glycosidic linkage (e.g., an "O"-glycosidic linkage). In some embodiments, compression may be performed without applying external heat to the top and bottom barriers 20, 30 or to the discrete particulates 42.

In some embodiments, method 1100 may further include heating the insulation panel 10 to at least partially and/or further adhere to the plurality of particulates to one another and to the top and bottom barriers 20, 30. In other embodiments, external heat may not be applied to the insulation panel 10. Regardless of whether external heat is applied, method 1100 may further include (i) creasing the insulation panel 10 into multiple sections (e.g., as shown in FIGS. 1D and 1E) and/or (ii) cutting the insulation panel 10 into a plurality of polygonal sheets. External heat may be applied to the insulation panel 10 during creasing, which may help the insulation panel 10 to better retain its shape long term compared to creasing without applying external heat. In some embodiments, the application of heat during creasing may cause at least some of the intrinsic moisture within one or more particulates 42 to vaporize, thereby altering the structure of those particulate(s) and/or hydrating portions of the starch structure to cause further adhesion. In some embodiments, creasing may involve applying about 100° C. of external heat and about 1000 pounds of force at a pressure of about 60-100 psi (pounds per square inch). In some embodiments, the application of heat and/or heat and pressure may cause the particulates 42 to thermoset at the location of the crease 18. To retain thickness when pressure is removed, in other embodiments, ultrasonic welding may be performed in order to help the insulation panel 10 to better retain its shape long term without applying external heat. Ultrasonic welding, also known as high-frequency acoustic vibration, may involve vibrating atoms within the insulation panel 10 during creasing and may advantageously allow for a segmented insulation panel 10 that can bend without creating internal stress of compression and tension, which could rupture the bonds between particulates 42 and/or between particulates 42 and top and bottom barriers 20, 30 and result in delamination. Creasing may also be used to create side seams on a panel or enclosed pockets between layers to enclose bonded or unbonded particulates 42 trapped by creased seams. Method 1100 may also include vibrating at least a portion of the bottom barrier to distribute the plurality of particulates into a single layer along the portion of the bottom barrier.

The design and functionality described in this application is intended to be exemplary in nature and is not intended to limit the instant disclosure in any way. Those having ordinary skill in the art will appreciate that the teachings of the disclosure may be implemented in a variety of suitable forms, including those forms disclosed herein and additional forms known to those having ordinary skill in the art. This disclosure is intended to cover various modifications and equivalent arrangements included within the scope of the appended claims. Although specific terms are employed herein, they are used in a generic and descriptive sense only and not for purposes of limitation.

It must also be noted that, as used in the specification and the appended claims, the singular forms "a," "an" and "the" include plural referents unless the context clearly dictates otherwise.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

As used herein, "bending" may refer to the ability of containerboard or combined board to be folded along scorelines without rupture of the surface fibers to the point of seriously weakening the structure.

As used herein, "biodegradable" may refer to a substance that is degradable over time by water and/or enzymes found in nature (e.g., compost), without harming, and in fact helping, the environment.

As used herein, "compostable" may refer to a product that will compost in such a manner that it is eligible for certification through the Vincott "OK Compost" labelling program.

As used herein, "compression strength" may refer to a corrugated box's resistance to uniformly applied external forces. Top-to-bottom compression strength is related to the load a container may encounter when stacked. End-to-end or side-to-side compression may also be of interest for particular applications.

As used herein, "corrugator" may refer to the machine that unwinds two or more continuous sheets of containerboard from rolls, presses flutes into the sheet(s) of corrugating medium, applies adhesive to the tips of the flutes and affixes the sheet(s) of linerboard to form corrugated board. The continuous sheet of board may be slit to desired widths, cut off to desired lengths and scored in one direction.

As used herein, "degradable" may refer to a substance that will undergo a process of deterioration or breaking-up by the action of natural forces (air, light, water) or by the addition of certain chemicals.

As used herein, "dimension" may refer to, for a regular slotted containers (RSC), box dimensions are expressed as length×width×height, always using inside dimensions.

As used herein, "facings" may refer to sheets of linerboard used as the flat outer members of combined corrugated board. Sometimes called inside and outside liners.

As used herein, "fiberboard" may refer to combined paperboard (corrugated or solid) used to manufacture containers.

As used herein, "flaps" may refer to an extension of the side wall panels that, when sealed, close the remaining openings of a box. Usually defined by one scoreline and three edges.

As used herein, "kraft" may refer to a German word meaning "strength"; designating pulp, paper or paperboard produced from wood fibers.

As used herein, "linerboard" may refer to the flat sheets of paper that comprise the outer surfaces of a sheet of corrugated board.

As used herein, "medium" may refer to the paperboard used to make the fluted layer of corrugated board.

As used herein, "overlap" may refer to a design feature wherein the top and/or bottom flaps of a box do not butt, but extend one over the other. The amount of overlap is measured from flap edge to flap edge.

As used herein, "panel" may refer to a "face" or "side" of a box.

As used herein, "paperboard" may refer to one of the two major product categories of the paper industry. Includes the broad classification of materials made of cellulose fibers, primarily wood pulp and recycled paper stock, on board machines.

As used herein, "recyclable" may refer to any product that is eligible for either curbside collection or for being accepted into recycling programs that use drop-off locations, particularly products granted permission to use the corrugated recycles symbol of the Fibre Box Association (FBA) in accordance with its guidelines (see, e.g., http://corrugated.org/upload/CPA/Documents/Vol_Std_Protocol_2013.pdf).

As used herein, "score" or "scoreline" may refer to an impression or crease in a rigid surface or board, made to position and facilitate folds.

As used herein, "score and slotted sheet" may refer to a sheet of corrugated fiberboard with one or more scorelines, slots or slits. May be further defined as a box blank, a box part, a tray or wrap, a partition piece, or an inner packing piece.

As used herein, "seam" may refer to the junction created by any free edge of a container flap or panel where it abuts or rests on another portion of the container and to which it may be fastened by tape, stitches or adhesive in the process of closing the container.

As used herein, "slit" may refer to a cut made in a fiberboard sheet without removal of material.

As used herein, "slit score" may refer to shallow knife cuts made in a box blank to allow its flaps and sides to be folded into a shipping box.

As used herein, "slot" may refer to a wide cut, or pair of closely spaced parallel cuts including removal of a narrow strip of material made in a fiberboard sheet, usually to form flaps and permit folding without bulges caused by the thickness of the material.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An insulation panel comprising:
   an insulation core layer comprising a plurality of discrete puffed polysaccharide particulates comprising at least a first particulate and a second particulate, the first particulate being at least partially adhered to at least the second particulate at one or more bonded areas without the use of external non-water-soluble adhesives, the plurality of discrete particulates defining a plurality of voids within the core layer.

2. The insulation panel of claim 1, wherein:
   the first particulate is at least partially mechanically adhered to at least the second particulate at the one or more bonded areas without the use of external non-water-soluble adhesives and without the application of heat to the first particulate and the second particulate,
   the first particulate having a generally circular to lenticular cross-section and a first particulate surface area,
   the second particulate is generally tubular and has a second particulate surface area, and
   a first contact surface area formed where the first particulate surface area contacts the second particulate surface area is larger than the one or more bonded areas such that at least a portion of the first contact surface area is unbonded.

3. The insulation panel of claim 2 further comprising an outer layer that at least partially covers the insulation core layer.

4. The insulation panel of claim 3, wherein the insulation core layer comprises a plurality polygonal insulation sheet sub-layers each comprising a plurality of discrete puffed polysaccharide particulates, the outer layer covering the plurality of insulation core sub-layers.

5. The insulation panel of claim 1 further comprising a first contact surface area formed where a first particulate surface area of the first particulate contacts a second particulate surface area of the second particulate, the first contact surface area comprising one or more bonded areas each having one or more bonds formed through one or more polymerization reactions between a polysaccharide component within the first particulate and a polysaccharide component within the second particulate.

6. The insulation panel of claim 5, wherein the first contact surface area comprises one or more externally-hydrated areas and one or more non-externally-hydrated areas, the one or more externally-hydrated areas forming at least a first bonded area of the one or more bonded areas and the one or more non-externally-hydrated areas being unbonded.

7. The insulation panel of claim 1, wherein the plurality of particulates further comprises a third particulate and a fourth particulate each at least partially adhered to another one of the plurality of discrete particulates without the use of external non-water-soluble adhesives, the insulation panel further comprising:
   a top barrier at least partially covering a top surface of the insulation core layer, the top barrier being at least partially adhered to at least the third particulate at one or more top bonded areas without the use of external non-water-soluble adhesives; and
   a bottom barrier at least partially covering a bottom surface of the insulation core layer, the bottom barrier being at least partially adhered to at least the fourth particulate at one or more bottom bonded areas without the use of external non-water-soluble adhesives.

8. The insulation panel of claim 7, wherein the top barrier is at least partially adhered to the third particulate without the use of external non-water-soluble adhesives and without the application of heat to the top barrier and the first portion of the plurality of discrete particulates, and the bottom barrier is at least partially adhered to the fourth particulate without the use of external non-water-soluble adhesives and without the application of heat to the top barrier and the first portion of the plurality of discrete particulates.

9. The insulation panel of claim 7, wherein the one or more bonded areas comprise a first covalent bond, the one or more top bonded areas comprise a second covalent bond, and the one or more bottom bonded areas comprise a third covalent bond.

10. The insulation panel of claim 9, wherein one or more of the first, second, and third covalent bonds comprises an "O"-glycosidic linkage.

11. The insulation panel of claim 10, wherein the plurality of discrete particulates comprises one or more starch vegetable particulates.

12. The insulation panel of claim 10, wherein:
   the third particulate comprises a third particulate surface area that contacts the top barrier at one or more top contact surfaces, the one or more top contact surfaces comprising the one or more top bonded areas and one or more non-hydrated unbonded areas, and
   the fourth particulate comprises a fourth particulate surface area that contacts the bottom barrier at one or more bottom contact surfaces, the one or more bottom contact surfaces comprising the one or more bottom bonded areas and one or more non-hydrated unbonded areas.

13. The insulation panel of claim 1, wherein one or more of the plurality of voids are at least partially filled with one or more of a cellulose filler, a shredded paper filler, and a recyclable reclaimed waste trim filler.

14. An insulation panel comprising:
a top paper-based barrier comprising kraft paper;
a bottom paper-based barrier comprising kraft paper; and
an insulation core layer disposed between to the top and bottom barriers and having a plurality of discrete polysaccharide particulates comprising at least an upper particulate, one or more central particulates, and a lower particulate, the upper particulate having an upper particulate surface area only a portion of which is at least partially adhered to the top barrier at one or more top bonded areas without the use of external non-water-soluble adhesives, the lower particulate having a lower particulate surface area only a portion of which is at least partially adhered to the bottom barrier at one or more bottom bonded areas without the use of external non-water-soluble adhesives, and the one or more central particulates collectively having a central particulate surface area at least a portion of which is at least partially adhered to one or more of the upper particulate surface area and the lower particulate surface area at one or more central bonded areas without the use of external non-water-soluble adhesives.

15. The insulation panel of claim 14, wherein the upper particulate is disposed proximate an upper surface of the core layer and hydrated with a first fluid that does not contain external non-water-soluble adhesives, the lower particulate is disposed proximate a lower surface of the core layer and hydrated with a second fluid that does not contain external non-water-soluble adhesives, and the one or more central particulates are disposed proximate a central area of the core layer such that it contacts one or more of the upper particulate and the lower particulate.

16. The insulation panel of claim 14, wherein the plurality of discrete particulates defines a plurality of voids within the core layer, and one or more of the plurality of voids are at least partially filled with one or more of a cellulose filler, a shredded paper filler, and a recyclable reclaimed waste trim filler.

17. The insulation panel of claim 14, wherein a non-externally-hydrated portion of the upper particulate surface area is unbonded, a first externally-hydrated portion of the upper particulate surface area comprises the one or more top bonded areas, and a second externally-hydrated portion of the upper particulate surface area comprises at least one of the one or more central bonded areas.

18. The insulation panel of claim 14 further comprising at least two creases separating at least three sections of the insulation panel, each of the at least three sections of the insulation panel being foldable relative to one another along one or more of the at least two creases.

19. The insulation panel of claim 18, wherein one or more of the upper, central, and lower particulates is generally tubular and comprises a deformed surface area region that contacts a first crease of the at least two creases.

20. An insulation panel comprising:
an insulation core layer comprising a plurality of discrete polysaccharide particulates comprising at least a first particulate and a second particulate, the first particulate being at least partially adhered to at least the second particulate at one or more central bonded contact surfaces without the use of external non-water-soluble adhesives and without the application of heat to the first particulate and the second particulate; and
an outer layer that at least partially covers the insulation core layer, the outer layer being at least partially adhered to one or more of the first and second particulates of the core layer at one or more peripheral bonded contact surfaces without using external non-water-soluble adhesives.

21. The insulation panel of claim 20, wherein at least the first particulate of the plurality of discrete particulates comprises a first previously-hydrated outer surface and a first non-hydrated outer surface, the first previously-hydrated outer surface of the particulate forming a bond with at least a portion of the second particulate within the one or more central bonded contact surfaces to at least partially adhered the first and second particulates.

22. The insulation panel of claim 20, wherein the first and second particulates each have a cross-section that is circular to lenticular in shape.

* * * * *